(12) United States Patent
Aglan

(10) Patent No.: US 9,358,628 B2
(45) Date of Patent: Jun. 7, 2016

(54) RAILROAD RAIL HEAD REPAIR

(71) Applicant: Heshmat Aglan, Tuskegee, AL (US)

(72) Inventor: Heshmat Aglan, Tuskegee, AL (US)

(73) Assignee: TUSKEGEE UNIVERSITY A UNIVERSITY OF ALABAMA, Tuskegee, AL (US)

( * ) Notice: Subject to any disclaimer, the term of this patent is extended or adjusted under 35 U.S.C. 154(b) by 310 days.

(21) Appl. No.: 13/717,137

(22) Filed: Dec. 17, 2012

(65) Prior Publication Data

US 2014/0166766 A1    Jun. 19, 2014

(51) Int. Cl.
*B23K 9/173* (2006.01)
*E01B 31/18* (2006.01)
*B23K 9/23* (2006.01)
*E01B 5/02* (2006.01)

(52) U.S. Cl.
CPC . *B23K 9/173* (2013.01); *B23K 9/23* (2013.01); *E01B 31/18* (2013.01); *B23K 2201/26* (2013.01); *E01B 5/02* (2013.01)

(58) Field of Classification Search
CPC ............ B23K 9/18; B23K 9/026; B23K 9/04; B23K 9/042; B23K 9/044; B23K 2201/26; B23K 2203/04; B23P 6/00; B23P 6/04; E01B 31/18; E01B 31/02; E01B 31/17; E01B 31/04; E01B 31/12
USPC ............... 29/407.07, 402.01, 402.03, 402.04, 29/402.05, 402.06, 402.08
See application file for complete search history.

(56) References Cited

U.S. PATENT DOCUMENTS

| | | | | |
|---|---|---|---|---|
| 7,520,415 | B2 * | 4/2009 | Kral et al. ...................... | 228/119 |
| 2011/0297752 | A1 * | 12/2011 | Keefe .............................. | 238/122 |
| 2013/0133784 | A1 * | 5/2013 | Kristan et al. ................. | 148/526 |

* cited by examiner

*Primary Examiner* — Jason L Vaughan
(74) *Attorney, Agent, or Firm* — Hogan Lovells US LLP

(57) ABSTRACT

A multi-pass gas metal arc weld ("GMAW") approach is used for in-situ repair of railhead defects. A defect is removed via machining a perpendicular slot or grove in the railhead leaving the web and base unaltered. A sufficient number of GMAW passes are used to fill the slot using a weld material suitable for the particular type of parent steel, and excess weldment can be removed. Optionally, for pearlitic steel rails post-weld heat treatment can be used to cause austenization and/or quenching of the weld. The weld heat inputs and other parameters are controlled to avoid ductile and brittle fracture related morphologies.

14 Claims, 24 Drawing Sheets

RAILROAD RAIL HEAD REPAIR

STATEMENT REGARDING FEDERALLY SPONSORED RESEARCH OR DEVELOPMENT

This invention was made with government support under grant award number DTFR53-02-G-00021 awarded by the U.S. Department of Transportation and Federal Railroad Administration. The government has certain rights in the invention.

FIELD OF THE INVENTION

The present invention relates to the repair of rail heads having defects therein. More particularly, the present invention relates to methods for in-situ repair of defects in rail heads, and repaired rails formed there from.

BACKGROUND OF THE INVENTION

Carbon-manganese steels are usually used for railroad track applications. The strength and toughness of steels used for forming such rails are controlled by alloying additions. In particular, high strength is achieved by additions of carbon, manganese, nickel and chromium, with carbon having the biggest effect. Adding nickel will also promote toughness, while decreasing sulfur and phosphorus content of the steel will also promote toughness.

The two types of steels that are most widely used in the railroad industry are pearlitic and austenitic manganese steels. Pearlitic steel provides high strength and wear resistance. Austenitic manganese steels are usually used in railway frogs because they exhibit high toughness, resistance to wear and impact loading. In recent years, bainitic steels have also been considered as a candidate material for railway tracks due to their unique mechanical properties.

Applicants previously published studies regarding the microstructure of pearlitic rail steels that are presently being used in the railroad industry in the United States and found that these steels consist of a fine lamellar aggregate of very soft and ductile ferrite and very hard carbide, cementite (Aglan et al., *J. Mat. Processing Tech.*, 2004, 151:268-274). These lamellae are aligned in the same orientation in one grain with each grain having an average size of 50 μm. The typical carbon content of the pearlitic steel is about 0.79% with an increase in carbon content, up to about 1%, giving a higher hardness.

Austenite manganese steel ("AMS") is currently used for crossings and frogs in the railroad industry. Crossings and frogs are considered to be very important as they are used to change the direction of the moving train. AMS is known to be extremely tough and durable with very good wear resistance properties and can withstand high impacts without catastrophic failure. At high temperature, however, AMS can dissolve more than 1% carbon within the austenitic microstructure. If the steel is cooled rapidly, all the carbon is retained in the solution. However, if it is cooled too slowly, carbide precipitation will occur at the grain boundaries and cause severe embrittlement.

Steel having a bainitic microstructure is comprised of a metastable aggregate of ferrite and cementite which is produced from the transformation of austenite at temperatures above the martensite starting temperature and below the pearlite range. Specific alloys are added to bainitic rail steels to enhance the formation of bainite. Bainitic rail steels are alloyed with approximately 0.5% molybdenum and trace amounts of boron. Molybdenum is added to delay the formation of ferrite and pearlite, boron to affect the transformation time, and manganese, nickel and chromium to decrease the bainitic transformation temperature.

One particular bainitic steel alloy that has become popular for railroad industry used is labeled J6, and has typical carbon content of approximately 0.26%. The J6 rail steel microstructure is bainite, having an average grain size of approximately 90 μm and a hardness between about 415-430 Brinell hardness ("HB"). This hardness increases the wear resistance of rail steels, but it also means that rail formed from such bainitic steels are more vulnerable to hydrogen cracking. Therefore, care is needed to control the hydrogen content of the bainitic rail steels. The bainitic rail steel is not as tough as AMS and is not able to endure the large cracks that AMS can tolerate.

When compared to conventional AMS, bainitic steels have an increase in hardness and strength, better resistance to deformation, better wear resistance and fewer casting defects. The bainitic structure also has an advantage over the pearlitic structure from the perspective of crack initiation and crack growth sites. This is because the bainitic structures do not have strong directional anisotropy which implies there are fewer sites for cracking to exist in the material. Bainitic steels, however, are also relatively more costly.

Fatigue failure of steel rail parts is the main cause of derailments and other severe railroad accidents. Because weld repairs to rail can alter the overall strength (i.e., hardness and toughness) of a rail, welding procedures need to be developed that provide optimum weld repair strength within cost and time constraints. Because of the unique rigors to which rail heads are exposed, it is important that any weld provide similar strength and flexibility characteristics to the parent steel. Studies have shown that rail welds are generally are more prone to defects than the parent rail and hence failure, because they are usually weaker than the rails they join (see, for example, Skyttebol et al., *Eng. Fracture Mech.*, 2004, 72:271-285; and Desimone et al., *Int'l J. of Fatigue*, 2006, 28:635-642). Inclusions, porosity, lack of fusion or other types of defects that may be present in the welded rail are the main crack initiation sites for weld fatigue failures. These defects may be small but are locations where fatigue cracks may initiate, propagate and lead to rail failure.

The microstructure of different steel alloys closely correlates to their mechanical properties. The toughness of carbon steels is typically dependent on the austenite grain size, where a decrease in the grain size will increase the fracture toughness. In most cases, an increase in the strength of steels decreases their toughness. Increasing the nickel content of welds is known to increase the welds' toughness and ductility. This is achieved by the reduction of ferrite, which in turn increases the austenitic content. The austenite structure is stabilized by the nickel content, which helps to prevent the formation of martensite. These conditions are favorable because the austenitic phase typically has high toughness and ductility when compared to martensite.

The hardness of a particular steel sample is also dependent on the constituent microstructures that are present, with increases in martensite and ledeburite giving an increased hardness. An increase in the cooling rate of a work piece will provide higher hardness values, but a cooling rate that is too fast may cause the base material to crack, especially in high carbon steels. The hardness of the welded pearlitic steel also tends to be lower than the corresponding parent rail steel. Martensitic and austenitic steel phases are harder than the terrific phase, which is the major phase present in the pearlitic weld without heat treatment. The thermal cycle associated with welding may cause the mechanical properties in the weld material and parent steel adjacent to the weld to be degraded by grain coarsening, precipitation and by segregation of trace impurities.

In particular, for a welded steel sample there are typically four distinct homogeneous zones. These zones include (working from the site of the weld outward) the weld zone, the coarse grain heat affected zone ("HAZ"), the fine grain HAZ and the parent material. These zones exist because when a single weld bead is laid on a metal, heat from this process can transform the microstructure of the adjacent original steel to austenite. Additionally, subsequent rapid cooling can then transform the austenite to martensite, which is not a preferred microstructure for most steel applications. If a sequence of several weld deposits, called multi-runs, is used for welding, the microstructure of the weld becomes much more complicated as the deposition of each successive layer of weld heat treats the underlying microstructure. The multi-runs may also temper the weld, which subsequently alters its mechanical properties.

Thus, heat input in particular is a very important characteristic of rail welding because it influences the heating and cooling related phase changes in the weld material and affects the microstructure and mechanical properties of the weld metal and the immediately adjacent HAZs. Heat input can be approximately characterized as the ratio of the arc power supplied to the electrode to the velocity of the heat source. Further, once welding is completed any heat treatment that the material undergoes is referred to as post-weld heat treatment ("PWHT"). Generally, this is done in welding to either improve the mechanical properties of the weld or to help in the prevention of defects, such as to increase resistance to brittle fracture, increase the strength of the material, and/or relax residual stresses present in the weldment. The use of PWHT, however, varies significantly from application to application and can effect material properties and microstructure.

Each of the various steels used to form rail parts thus introduce weldability challenges, especially in the case of in-situ repairs on railroad lines. Currently, flash-butt welding ("FBW") and thermite welding processes are the most commonly employed, but both are very expensive and time consuming. To affect a rail head repair via flash-butt or thermite welding, upon detecting a defect in the railway track, a rail section of approximately 6 meters in length containing the defect is removed and replaced with a new rail of the same steel and then welded into place. The major drawbacks of both thermite welding and FBW, including cost, time, weakening of the rail head, and ineffective control of microstructural changes due to thermal effects, have led to a current need for a more cost effective, efficient and practically viable methodology for the in-situ repair of rail defects.

Slot repair of rail head defects has been proposed as an alternative to FBW and thermite welding, but to date this approach has not been successfully adapted to rail applications. For example, a prior study by Applicants regarding slot welding of rail heads of pearlitic steel rails found that slot welding produced a strength and hardness mismatch between the parent rail material and the weld material, with the weld being both lower in strength and hardness (see Aglan, "Fracture and Fatigue Evaluation of Slot-Welded Railhead Repairs," Federal Railroad Administration Report RR08-26, November 2008). All welded samples tested in that study failed at the fusion line, indicating that the slot welding process used therein didn't obtain proper fusion between the weld and the parent rail steel.

SUMMARY OF THE INVENTION

It is an object of one or more embodiments of the present invention to provide methods for weld repair that are applicable to the different rail steel materials commonly utilized in the rail industry.

Furthermore, it is an object of one or more embodiments of the present invention to provide methods that provide improved quality of welded railhead repairs, reduced time and cost of rail repair, enhanced durability of welded rails, and improve rail safety.

Additionally, it is an object of one or more embodiments of the present invention to provide methods for cost effect repair of rail head defects.

The various embodiments of the present invention achieve these and other objects with the use of slot welding via multipass gas metal arc welds ("GMAW") to effect in-situ repair of railhead defects. In embodiments of the invention, once a defect is detected in the railhead and accurately mapped, it is removed via machining a slot perpendicular to the longitudinal direction of the rail, which slot contains the defect. During this machining step, care is taken to ensure that the web and base of the rail are untouched and intact while the entire defect is removed. Depending upon the type of steel, the original rail head welding area, including the slot and preferably extending out beyond what will be the HAZ, is preheated uniformly to raise the temperature in a manner that will decrease heat flux away from the weld site. Preferably, the preheat temperature and heating/cooling rate is selected so as to avoid cracking of the metal in the HAZ and the weld metal. Suitable preheat temperatures for pearlitic steel and bainitic steel are about 150° C. to about 450° C. and about 125° C. to about 175° C., respectively. The most preferred preheat temperature for both pearlitic and bainitic steel is about 150° C., while for AMS it is preferred that no preheat temperature is applied to avoid carbide precipitation.

In certain embodiments of the invention, the GMAW process begins after preheating, and a sufficient number of passes are used until the slot is completely welded using a weld material suitable for the particular type of parent steel forming the rail head being repaired. Once the weld area returns to a suitable (e.g., room) temperature, excess weldment can be removed, such as by standard machining techniques, such that the weld and the parent rail head steel provide a continuous and substantially smooth rail head.

Suitable weld materials may be selected to closely mimic the composition of the steel type being repaired. For example, suitable weld materials include LA-100 (Lincoln Electric), ESAB120 (ESAB Welding and Cutting), and ESAB140 (ESAB Welding and Cutting) for pearlitic steel rails, ESAB 140 for bainitic steel rails, and FrogMang (Lincoln Electric) for AMS rails.

In certain embodiments, suitable heat input and feed speed for pearlitic steel, bainitic steel, and AMS during the GMAW process include 1.20-1.55 KJ/mm and 9.0-10.5 m/min, 1.55-1.70 KJ/mm and 10.5-12.0 m/min, 1.10-1.25 KJ/mm and 4.5-6.0 m/min, respectively. The most preferred heat input and feed speed during the GMAW process are 1.27, 1.65, 1.17 KJ/mm and 9.9, 11.4, 5.1 m/min for pearlitic steel, bainitic steel, and AMS, respectively.

Additionally, arc travel speeds suitable for the GMAW process can range from about 300 to 420 mm/min, with preferred parameters of approximately 372 mm/min, 305 mm/min, and 415 mm/min for pearlitic, bainitic, and manganese steels, respectively.

It is most preferred to use ESAB-140 wire as the filled material for pearlitic steel rail repairs. If this wire is used, the most preferred wire speed is approximately 10.0 m/min, the most preferred arc travel speed is 372 mm/min, the most preferred heat input is 1.25 KJ/mm, and the most preferred preheating temperature is 150° C. Using ESAB-140 When LA-100 is used as the pearlitic filler material, the most preferred wire speed is approximately 10.24 m/min, the most preferred arc travel speed is 352 mm/min, the most preferred heat input is 1.53 KJ/mm, and the most preferred preheating temperature is 400° C. For ESAB-120 wire in pearlitic rail repairs, the most preferred wire speed is approximately 9.4 m/min, the most preferred arc travel speed is 343 mm/min, the most preferred heat input is 1.47 KJ/mm, and the most preferred preheat temperature is 250° C.

Optionally, PWHT can be applied to the weld prior to or following machining to cause austenization and/or quenching of the weld. Preferred embodiments of the invention in the case of pearlitic steel rails may further include the step of PWHT to increase hardness of the weld thereby making it much closer to the hardness of the parent pearlitic steel by causing its microstructure to adopt martensitic and austenitic phases. Such PWHT most preferably can be achieved by heating of the pearlitic steel rail area surrounding and including the repair area to a temperature just above the steel's austenization temperature, holding the rail at that temperature for a short time, and then quenching. The austenization temperature of typical rail pearlitic steels is approximately 815° C., and Applicants found that heating pearlitic steel rails to approximately 855° C., holding for approximately 2-20 minutes, and then quenching in an agitated room temperature bath provided unexpectedly superior PWHT results compared to the prior art techniques. For example, heating to 855° C., holding for 2 minutes, and then quenching was found to increase the hardness of the average pearlitic steel slot weld by approximately 23%, from about 301 HB to about 372 HB.

Applicants confirmed the superiority of the repaired rail heads produced according to methods of the present invention by preparing weld joints with samples of three different rail steels—pearlitic, bainitic and Hadfield manganese steels. Slots were machined in each sample to simulate the removal of service defects, and multi-pass GMAW was used to fill and repair the slots to identify the optimum wire composition for each base rail head material. Welding parameters including preheat, interpass temperature and heat input were also recorded. Finite element analysis was performed to determine the heat distribution, the width of the fusion region and the size of the HAZ during the welding process. The hardness distribution, tensile, flexural, fracture toughness and fatigue crack propagation ("FCP") tests were performed on specimens from the welded joints and compared with the parent materials to determine the mechanical integrity of the slot repairs.

Applicants' experiments provided scanning electron microscopy ("SEM") data that established lower than optimal weld heat input can generate dimples in the HAZ impact fracture, which is related to a ductile fracture. Furthermore, as the heat input is increased, the fracture morphology of the HAZ changes to a quasi-cleavage fracture that consisted of river patterns, which are indicative of potential for brittle fracture. Thus, preferred embodiments of Applicants' inventions utilize weld heat inputs as described above that are sufficiently high to avoid these ductile fracture characteristics and sufficiently low to avoid unwanted brittle fracture related morphologies.

One particular preferred embodiment of the invention comprises a method for repairing railhead defects in a steel rail, which includes (1) removing the railhead defect by forming a slot in a railhead of a steel rail, removing the defective material and some surrounding material, said slot being formed in a general perpendicular direction to the longitudinal direction of the rail; (2) selecting a welding material having physical properties closely correlating with those of the steel rail in order to maximize the strength of the repaired rail head; (3) using welding material to fill the slot by multi-pass gas metal welding ("GMAW") at a heat input that is sufficiently high to avoid ductile fracture characteristics and sufficiently low to avoid brittle fracture characteristics, wherein a sufficient number of passes of said GMAW is performed until said slot is completely filled by a weld formed from said welding material; and (4) removing any excess welding material extending out of said slot so as to form a substantially continuous repaired railhead surface.

In this method, as in the other methods described herein, heating and cooling is controlled to maximize the strength of the repaired rail head by minimizing thermal damage cause by non-uniform heating/cooling or heating/cooling rates that are too fast.

Additional embodiments of the invention include a method for repairing railhead defects in a steel rail, comprising (1) removing the railhead defect by forming a slot in a railhead of a steel rail, said slot removing defective material and some surrounding material, said slot being formed in a general perpendicular direction to the longitudinal direction of the rail; (2) uniformly heating the removed material to decrease heat flux away from the weld site; (3) selecting a welding material having physical properties closely correlating with those of the steel rail; (4) using said welding material to fill the slot by multi-pass gas metal arc welding ("GMAW") at a heat input that is sufficiently high to avoid ductile fracture characteristics and sufficiently low to avoid brittle fracture characteristics, wherein a sufficient number of passes of said GMAW is performed until said slot is completely filled by a weld formed from said welding material; (5) removing any excess welding material extending out of said slot so as to form a substantially continuous repaired railhead surface, Further, embodiments of the invention also include a method for repairing railhead defects comprising (1) uniformly preheating the area to be repaired; (2) selecting a welding material having physical properties closely correlating with those of the steel rail; (3) using multi-pass gas metal arc welding ("GMAW") at a heat input that is sufficiently high to avoid ductile fracture characteristics and sufficiently low to avoid brittle fracture characteristics and with controlled heating and cooling rates; (4) wherein the repaired railhead has improved resistance to material separation, total fatigue lifetime, flexural residual strength, and crack growth rate compared to the parent steel being repaired.

Further embodiments of the invention include repaired rail materials made via any combination of the methods described herein, including the preferred embodiments. For example, repaired railheads using methods of the invention have improved structural and mechanical properties as compared to the parent material, such as improved resistance to material separation, reduced crack growth rate, improved total fatigue lifetime, and increased flexural residual strength.

The various embodiments of the invention having thus been generally described, several illustrative embodiments will hereafter be discussed with particular reference to several attached drawings and in view of various experimental examples.

DETAILED DESCRIPTION OF THE PREFERRED EMBODIMENTS

For use in the various experiments and tests described below, Applicants selected a pearlitic steel, a bainitic steel, and a Hadfield manganese steel. The pearlitic and bainitic steels were provided by the Transportation Technology Center, Inc. (TTCI), which are from actual new rails. The Hadfield manganese steel with comparable composition to austenitic manganese rail steels was manufactured at Applicants' request by Stulz Sickles Steel Company. The chemical compositions of the steels used are given in Table 1 below based on the specifications from the manufacturing companies.

TABLE 1

| Element | Pearlitic | Bainitic | Manganese |
| --- | --- | --- | --- |
| C | 0.97 | 0.23 | 1.0-1.25 |
| S | — | 0.008 | 0.035 max |
| P | ~0.015 | 0.012 | 0.008 max |
| Si | 0.405 | 1.96 | 0.025-0.045 |
| Cr | ~0.22 | 1.84 | — |
| Ni | — | 0.14 | — |
| Mn | 0.85 | 1.93 | 12-14.0 |
| Cu | ~0.3 | 0.13 | — |
| Mo | — | 0.43 | — |
| Ti | 0.01 | 0.034 | — |
| Al | — | 0.045 | — |
| V | — | 0.007 | — |
| W | — | 0.01 | — |
| B | — | 0.0047 | — |

Three different filler materials were used in the experiments described below to slot weld the pearlitic steels, namely LA-100, ESAB120 and ESAB140. Slot welding of bainitic rail steels in the experiments were performed using only the ESAB140 wire, while for the Hadfield manganese steel only FrogMang was used. FrogMang wire is specifically designed for hardfacing of worn manganese frogs and crossing diamonds in the railroad industry. The elemental composition of the filler metals used is shown in Table 2 below.

TABLE 2

| Element | LA-100 | ESAB120 | ESAB140 | J. W. Harris (ER70S-2) | FrogMang (6 Layers) |
| --- | --- | --- | --- | --- | --- |
| C | 0.05-0.06 | 0.05 | 0.08 | 0.04 | 1.07 |
| S | 0.002-0.005 | 0.004 | 0.006 | 0.005 | — |
| P | 0.005-0.009 | 0.005 | 0.005 | 0.0003 | — |
| Si | 0.46-0.50 | 0.005 | 0.4 | 0.55 | 4.59 |
| Cr | 0.04-0.06 | 0.3 | 0.9 | 0.08 | 0.17 |
| Ni | 1.88-1.96 | 2.3 | 2.4 | 0.08 | — |
| Mn | 1.63-1.69 | 1.6 | 1.7 | 1.08 | 25.5 |
| Cu | 0.11-0.14 | — | — | 0.20 | — |
| Mo | 0.43-0.45 | 0.5 | 0.6 | 0.08 | — |
| Ti | 0.03-0.04 | — | — | 0.10 | — |
| Al | ≤0.01 | — | — | 0.08 | — |
| Zr | ≤0.01 | — | — | 0.07 | — |

Figure 1:
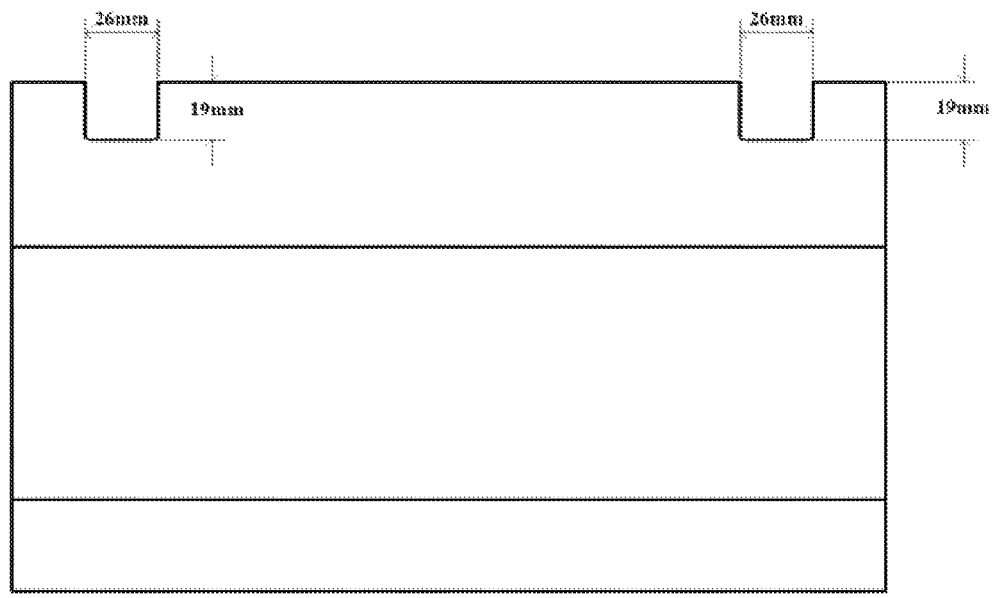
FIG. 1 through FIG. 3 are photographs of representative rail steel samples repaired according to an embodiment of the present invention.

Unless otherwise specified herein, Applicants used a MSC vertical milling machine to mill slots in the center of the railhead. The milling machine was equipped with a Workhorse Power Table Feed, AL-300S. It also has a digital readout package that is manufactured by Acu-Rite. The slots were milled in the longitudinal direction to simulate the removal of service defects, and each slot had width of 26 mm and depth of 19 mm. The slots were finished by thoroughly cleaning them using a wire brush and acetone to remove any debris or residue that was present. An image of a representative rail with the slots removed is shown in FIG. 1.

Unless otherwise stated herein, preheating was achieved using electrical strip heaters, which may be used in the field with, for example, an electrical source. Of course, other heating techniques known to those of skill in the art and compatible with the methods of the invention could also be utilized. A Miller Shopmate 300 DX welder was used, unless otherwise stated herein, for the GMAW. The rated output for this welder is 300 amp at 32 volt DC and this equipment may be modified for field use. Of course, other GMAW equipment known to those of skill in the art and compatible with the methods of the invention may also be used.

Figure 2:
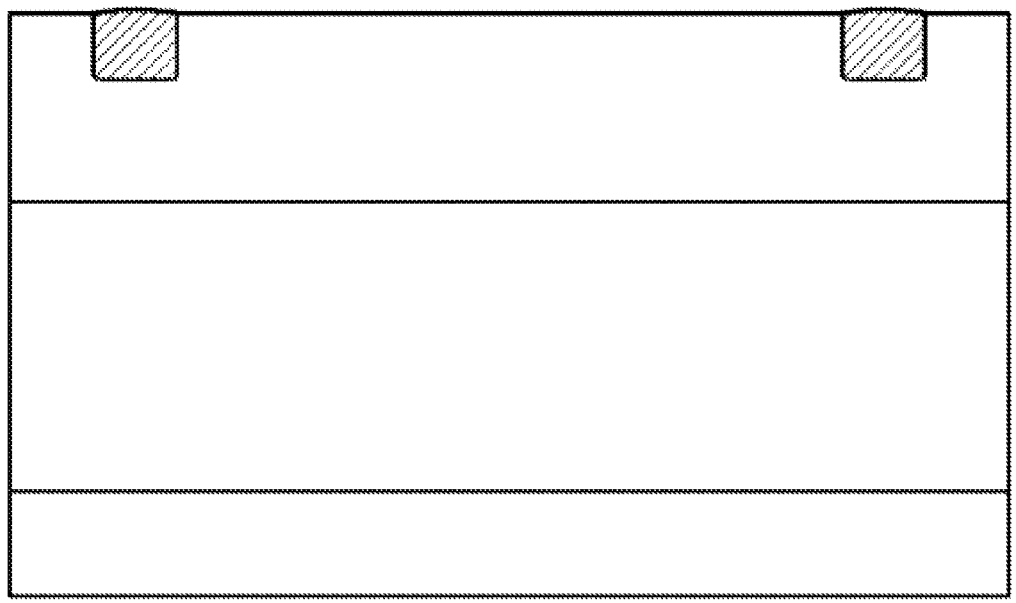

Heat strips were clamped on both sides of the web of the rail. An insulation made from ceramic fibers was used to wrap the web and base of the rail. An image of a representative rail steel sample after slot welding is shown in FIG. 2.

Figure 3:
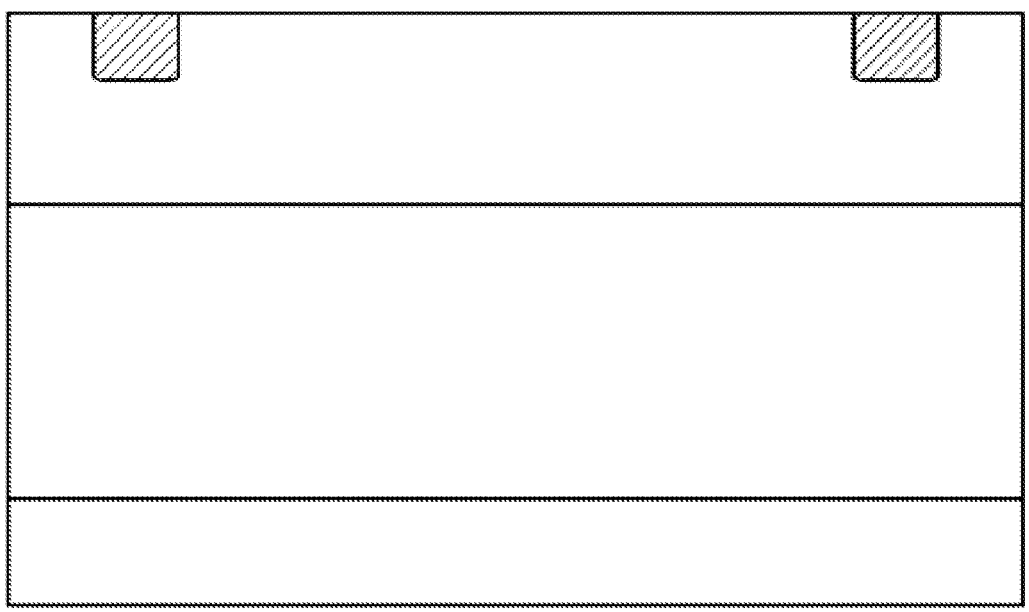

In all experiments described below, before testing, the excess weld material was removed from the slot when the rail reached ambient temperature by grinding to form a continuous, and substantially smooth rail head. The grinder used was a DeWalt 4.5 inch, 10 amp paddle corded grinder. An image of a representative rail sample following this grinding and before any testing is shown in FIG. 3.

Unless otherwise set forth herein, specimens were removed from the welded steel for testing using a Series 8 Mark II vertical metal cutting band saw, which was manufactured by Marvel Manufacturing Company, Inc.

Unless otherwise specified herein, Applicants investigated and compared optically the microstructures of the parent steel and their corresponding HAZ and weld material using an Olympus GX51 inverted metallurgical microscope. The microscope was equipped with a PAXcam5 digital microscope camera that is capable of capturing 5 megapixel images. The camera was connected to a computer running PAX-it 7.2 software, a commercially-available image capturing and analysis software.

Unless otherwise specified herein, Applicants investigated and compared the fracture surface morphology of the parent and welded rail steels were examined with a Hitachi S-3400-N scanning electron microscope ("SEM"). Typical micrographs revealing representative fracture surface morphology of the various samples were captured using Hitachi's PCI-Image management software.

Unless otherwise set forth herein, prior to metallurgical studies, the samples to be examined were first sectioned and then mounted in PhenoCure Black hot mount compound using the SimpliMet 1000 automatic mounting press, manufactured by Buehler. After mounting, the mounts were ground and polished on the EcoMet/AutoMet 250 grinder-polisher capable of polishing six samples simultaneously. The samples were ground using different SiC grit papers and polished using select polishing cloth and abrasive liquid until the surface was free of microscopic scratches. Each mounted sample was etched with 2% nital solution after polishing, unless mentioned otherwise.

Test 1—Microstructure

Figure 4A:
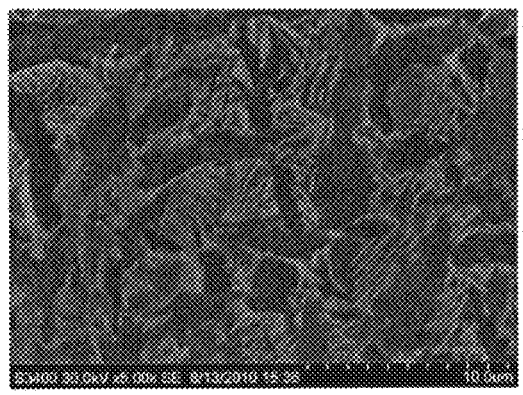
FIG. 4A through FIG. 4C are black and white photographs of SEM images of weld, HAZ, and parent material, respectively, for a representative slot-welded pearlitic steel using ESAB140 wire according to one embodiment of the invention.
Figure 4B:
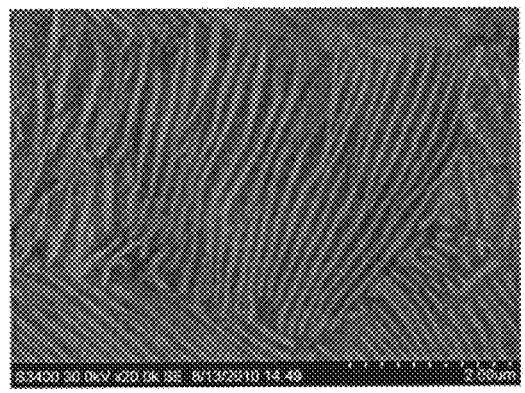
Figure 4C:
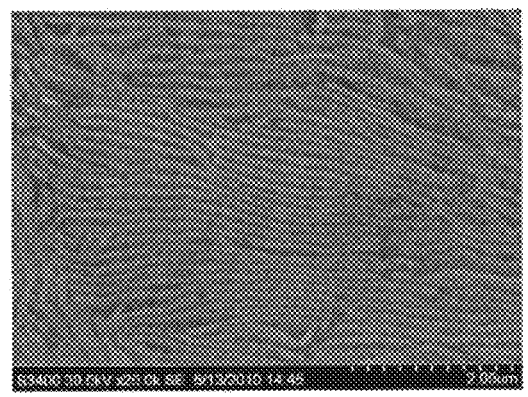

Scanning electron microscopy was used to further examine the microstructural features of the welded zone, the HAZ and the parent pearlitic steel. The black and white micrograph photograph in FIG. 4A is for the welded region at 5000 magnification. The mixture of ferrite and pearlite is clearly seen. The lamella structure of the pearlite phase is more detailed in the SEM micrographs than the optical. The HAZ of the welded pearlitic steel consists of coarse pearlite, while the parent pearlitic rail steel contains fine pearlite, as can be seen in the black and white micrograph photographs of FIG. 4B and FIG. 4C, respectively. These images were captured at 20000 magnification to illustrate the difference in the lamellar spacing. The lamellar spacing in the HAZ and parent rail steel was measured and found to be approximately 0.2 µm and 0.1 µm, respectively. The increase in lamellar spacing of the HAZ explains the decrease in its hardness.

Figure 5A:
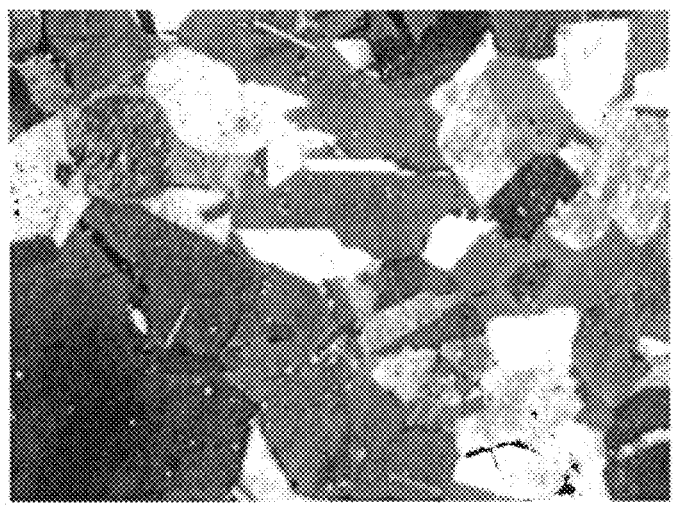
FIG. 5A through FIG. 5C are color photographs of micrograph images for a representative slot-welded manganese steel according to one embodiment of the invention showing the steel very close to the unaffected parent material, between the fusion and the unaffected parent material, and close to the fusion zone, respectively.
Figure 5B:
Figure 5C:

Representative color micrographs taken at the HAZ of the slot welded manganese steel are shown in the color photographs of FIG. 5A through FIG. 5C. FIG. 5A was captured close to the unaffected parent material (in the material location labeled with arrow 34a in FIG. 34, as discussed further hereafter) and consists of small amounts of impurities and annealing twins. The average grain size was close to that of the parent material. The micrograph in FIG. 5B was taken between the unaffected parent material and the fusion zone (the location indicated by the arrow 34b in FIG. 34). This micrograph shows very few impurities on the surface with a limited number of annealing twins. The average size of the grains was 31 µm. Close to the fusion zone (in the material location labeled with arrow 34c in FIG. 34) did not show any impurities, but rather consisted of a few annealing twins as shown in the representative micrograph of FIG. 5C. The average size of the grains is 30 µm. It was noticed that all the micrographs taken from the HAZ, as well as the weld, have approximately the same average grain size and contain annealing twins. However, moving from the unaffected parent material towards the fusion zone, the impurities are decreasing. This decrease in impurities would indicate an increase in the hardness and mechanical properties since there are less carbide precipitates. This decrease in carbide precipitates would explain the hardness increase seen in the HAZ of the hardness distribution (see generally, FIG. 34).

Figure 6A:
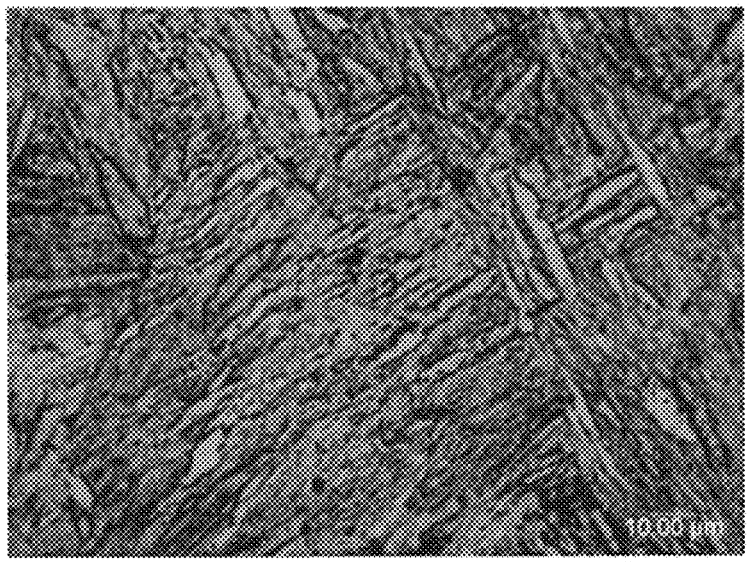
FIG. 6A and FIG. 6B are color photographs showing the microstructure of a representative sample of GTAW bainitic steel repaired according to embodiments of the invention using JW Harris filler showing the weld, and the HAZ region, respectively.
Figure 6B:
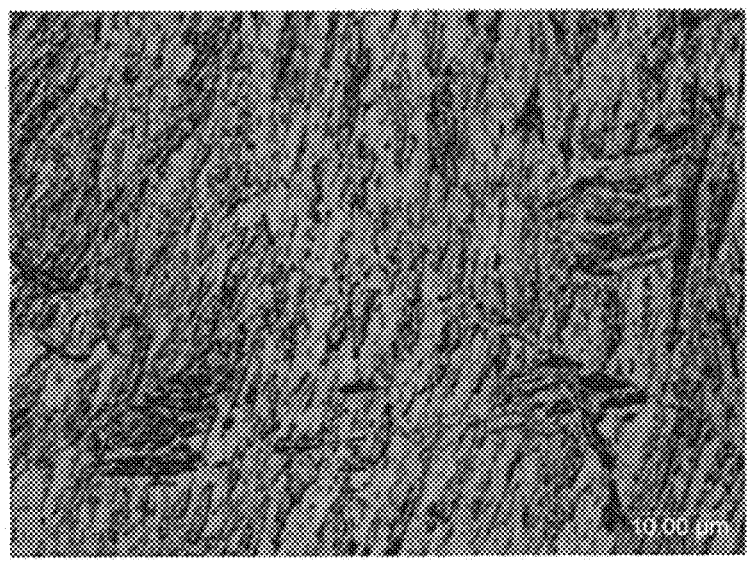

The microstructure of the bainitic steels welded with the ER-70S-2 wire is shown in the color micrograph photographs of FIG. 6A and FIG. 6B. The welded region depicted in FIG. 6A consists of lath martensite. The martensitic lath structure present in the micrograph, when compared to the ESAB120 weld, was much smaller. The smaller size of the lath martensite was attributed to the addition of titanium and zirconium to the filler metal. These elements are added to the filler material to improve grain refinement, which in turn increases the strength and toughness of the weld. This increase in strength and toughness is reflected in the higher weld efficiency (78%). The HAZ, shown in FIG. 6B, consists of tempered bainite and retained austenite with a fair amount of martensite. The grain boundaries are very thin, similar to the parent bainitic structure.

Test 2—Tensile Strength and Fracture Toughness

Figure 7:
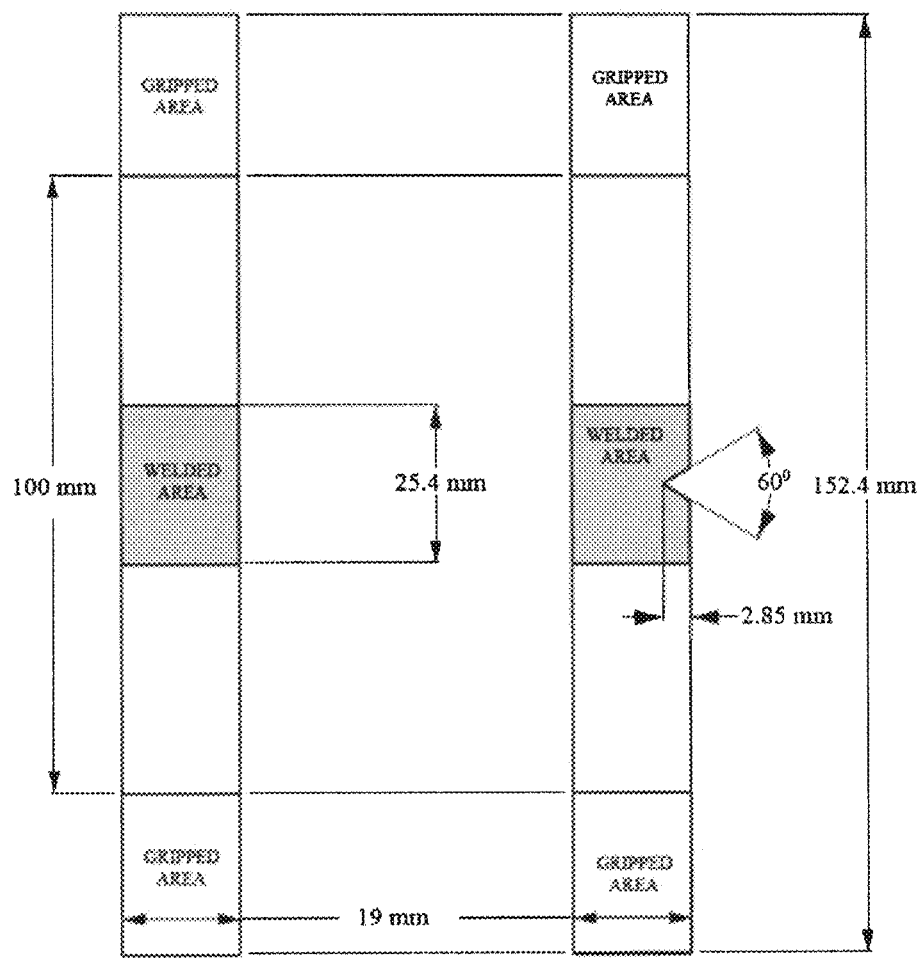
FIG. 7 is a schematic diagram illustrating the specimen and force application geometry employed in certain experiments herein in static tensile tests for both un-notched samples (left side) and notched samples (right side).

Static tensile experiments were performed using an MTS 810 servo hydraulic material testing system equipped with a 100 kN load cell. The static tests were performed using displacement control conditions at a rate of 0.02 mm/sec. Static tensile test results of the unnotched and notched specimens (60°) were used to calculate the tensile strength, residual strength and plane stress fracture toughness. The sample geometries used for static tensile tests are shown in the schematic diagram of FIG. 7, with thickness of 2 mm, width of 19 mm and gauge length of 100 mm. Parent steels were also tested for comparison.

Figure 8:
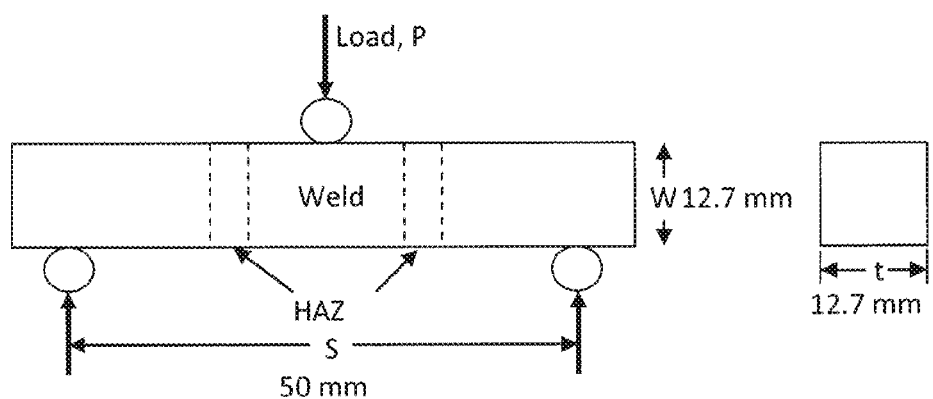
FIG. 8 is a schematic diagram illustrating the specimen and force application geometry employed in three point bend tests as described in certain experiments herein.

Also, the flexural fracture toughness of the parent and slot welded rail steels was studied and compared through the following set of experiments. For each slot weld prepared, three test samples (12.7 mm×12.7 mm×80 mm) were machined from both parent and slot welded steels. A 90° notch was introduced in the center of each specimen for the flexural fracture toughness measurements only. Three specimens from both the parent and welded rail steels were pre-cracked and tested for fracture toughness, $K_I$, evaluation. The flexural behavior of the parent and slot welded steels were evaluated using an un-notched three point bend test. This test was selected because bending stresses associated with wheel passage are responsible for crack propagation in rail steels. The geometry and loading configuration of the un-notched specimen used for three point bend tests is shown in FIG. 8. Flexure tests were performed on un-notched specimens, which were used to calculate the flexural stress of the materials based on the equation:

$$\sigma_f = \frac{3SP}{2BW^2} \qquad \text{Equation 1}$$

where $\sigma_f$ is the flexural stress, S is the span, P is the load, B is the specimen thickness and W is the specimen depth. Flexural fracture tests were also performed on notched specimens from the welded steels with a 90° notch, machined in the center of the weld that was 5.2 mm deep. The results of three point bend tests of notched specimens were used to calculate the fracture toughness and flexural residual strength of each material. The results were compared with other samples without pre-cracking (90° notch only). Pre-cracking of three point bend specimens of the parent and slot welded pearlitic rail steels decreases the fracture resistance in comparison to the samples that were not pre-cracked.

In the bainitic steel, three specimens from both the parent and welded rail steels were pre-cracked and tested for fracture toughness, $K_I$, evaluation. The results were compared with other samples without pre-cracking (the 90° notch only). The samples without pre-cracking showed that the fracture toughness of the parent bainitic steel was higher than the fracture toughness of the pre-cracked sample which was about the same as the previously reported $K_{IC}$ reported for compact tension specimens (see Aglan et al., *J. of Mech. of Materials and Structures*, 2007, 2(2):335-346).

The fracture toughness was calculated based on ASTM E1820, for both parent and the welded Manganese steels. The calculation is based on the area under the load-displacement curves. The fracture toughness is the sum of the elastic and plastic portions of the load-displacement curves.

The general expression of the plane strain fracture toughness in accordance with ASTME339 for a three point bend flexural specimen used to compare the parent and welded rail steels is:

$$K_I = \frac{3SP}{2tW^2} \sqrt{\pi a}\, f(a/W) \qquad \text{Equation 2}$$

where S is the span (distance between the two bottom rollers), P is the load, t is the specimen thickness, W is the specimen depth, a is the crack length and f(a/W) is a geometrical correction factor. The geometrical correction factor, f(a/W), from the above equation, can be expressed as:

$$f(\alpha) = \frac{1.99 - \alpha(1-\alpha)(2.15 - 3.93\alpha + 2.7\alpha^2)}{\sqrt{\pi}\,(1+2\alpha)(1-\alpha)^{3/2}} \qquad \text{Equation 3}$$

To validate the calculated value of K as a true $K_{IC}$ fracture toughness, the following conditions outlined by the ASTME1820 standard must be met.

$$(W-a), a \text{ and } B \geq 2.5(K_Q/\sigma_y)^2 \qquad \text{Condition 1:}$$

$$P_{max}/P_Q < 1.1 \qquad \text{Condition 2:}$$

In the above, B is the specimen thickness. For the specimens under consideration, the slot weld configuration imposed constraints on the specimen geometry to have a valid $K_{IC}$. Nevertheless, for ranking purposes, a value of a stress intensity factor designated as $K_I$ was calculated based on the maximum load attained from the fracture specimen.

The average value of $K_I$ (calculated using Equation 2) for the parent and welded bainitic steel is 128 MPa·m$^{1/2}$ and 121 MPa·m$^{1/2}$, respectively. The values of $K_1$ indicate that there is a decrease of 6% in the fracture toughness value of the slot welded bainitic rail steel compared to the parent bainitic rail steel. The geometry and test results for the parent and slot welded bainitic rail steels based on the flexural bend tests of notched specimens are summarized in Table 3 and Table 4 below. Table 3 reports the flexural bend test specimen geometry and test results for bainitic and welded bainitic rail steels. As shown in Table 3 below, the maximum load attained for the parent bainitic rail steel was 24 kN compared to 22 kN for the slot welded bainitic rail steel.

TABLE 3

| Sample | W (mm) | t (mm) | a (mm) | a/W | f(a/W) | $P_m$ (kN) | $K_1$ MPa·m$^{1/2}$ |
|---|---|---|---|---|---|---|---|
| Test results for the parent bainitic steel | | | | | | | |
| B1 | 12.77 | 12.77 | 5.15 | 0.403 | 1.19 | 24.48 | 132.8 |
| B2 | 12.76 | 12.75 | 5.20 | 0.408 | 1.19 | 22.59 | 124.4 |
| B3 | 12.75 | 12.75 | 5.15 | 0.404 | 1.19 | 23.08 | 125.9 |
| Average value of $K_I$ | | | | | | | 128 |
| Test results for the welded bainitic steel | | | | | | | |
| BW1 | 12.73 | 12.76 | 5.19 | 0.408 | 1.19 | 22.08 | 121.7 |
| BW2 | 12.76 | 12.74 | 5.25 | 0.411 | 1.20 | 21.77 | 121.5 |
| BW3 | 12.76 | 12.76 | 5.23 | 0.410 | 1.20 | 21.43 | 118.6 |
| Average value of $K_I$ | | | | | | | 121 |

Table 4 reports the fracture toughness values for parent and welded bainitic steel with and without pre-cracking in comparison with known $K_{IC}$ compact tension results as previously reported by H. Aglan et al., *J. Mechanics of Materials and Structures*, 2007. 2(2): p. 335-346.

TABLE 4

| | 3pt Bend (no Pre-cracking), $K_I$ | 3pt Bend (Pre-cracked), $K_P$ | Compact Tension, $K_{IC}$ |
|---|---|---|---|
| Parent | 128 ± 4.46 | 51 ± 2.33 | 52 ± 0.83 |
| Weld | 121 ± 1.69 | 89 ± 2.98 | — |

Figure 9:
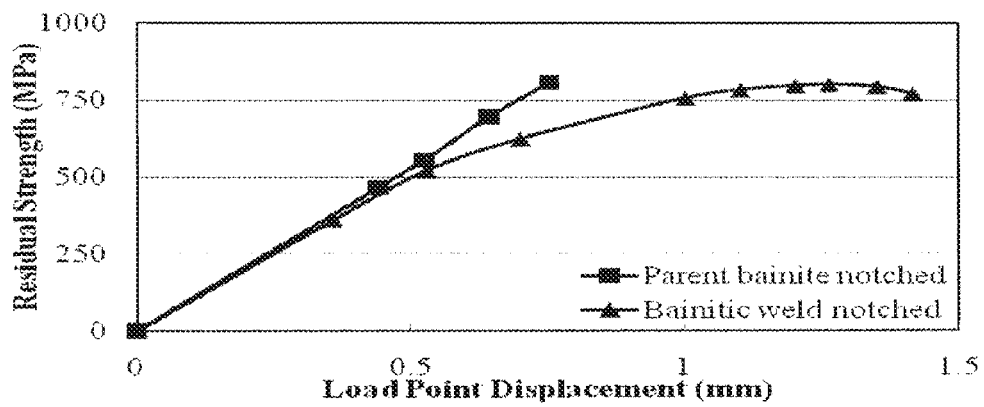
FIG. 9 through FIG. 11 are plots reporting flexural strength curves for parent and welded steel samples according to certain experiments detailed herein.

Applicants calculated the flexural residual strength from the results and the average flexural residual strength vs. LPD curves of the notched parent and slot welded bainitic rail steels are shown in FIG. 9. To validate the calculated value of K as a true $K_{IC}$ fracture toughness, the following conditions were met.

$$a \text{ and } B \geq 2.5(K_Q/\sigma_y)^2 \qquad \text{Equation 4}$$

$$P_{max}/P_Q < 1.1 \qquad \text{Equation 5}$$

Both parent and welded samples display elastic-plastic behavior with a short portion of elastic behavior followed by an extended plastic behavior. The flexural residual strengths of the parent and slot welding manganese steels are 365 MPa and 487 MPa, respectively.

To validate the value of K as a true $K_{Ic}$ fracture toughness $P_{max}/P_Q<1.1$ (Equation 5). The values of $P_{max}/P_Q$ in the parent and welded manganese specimens are much higher than 1.1. Therefore, this invalidates one of the requirements for a valid $K_{Ic}$ test. A K value was calculated based on the maximum load sustained by the specimens (namely, as defined by the sum $J_I=J_{EL}+J_{PL}$). It is reasonable to assume that $J_{EL}$ is very small in comparison with $J_{PL}$, and thus it can be concluded that $J \sim J_{PL}$ and the following equation can be written.

$$J_I = J_{PL} = \frac{2\eta}{B(W-a)} \quad \text{Equation 6}$$

Microcal Origin was used to calculate the area under the load-displacement curve and the $J_I$ values were calculated for the parent and welded manganese samples. Table 5 below reports the experimental results for the flexural bend test specimen tests for parent and welded manganese steels.

TABLE 5

| Sample | W | B | a | a/W | f(a/W) | $P_m$ | $A_{pl}$ | K | J |
|---|---|---|---|---|---|---|---|---|---|
| Test results for the parent manganese steel | | | | | | | | | |
| M1 | 12.71 | 12.57 | 5.25 | 0.41 | 1.20 | 10.04 | 24.95 | 57.91 | 536.38 |
| M2 | 12.67 | 12.59 | 5.26 | 0.42 | 1.21 | 9.92 | 25.22 | 57.46 | 543.17 |
| M3 | 12.93 | 12.56 | 5.26 | 0.41 | 1.19 | 10.42 | 25.81 | 58.66 | 546.79 |
| Average values | | | | | | | | 58.01 | 542.11 |
| Test results for the welded Manganese steel | | | | | | | | | |
| MW1 | 13.10 | 11.49 | 4.85 | 0.37 | 1.13 | 12.98 | 26.69 | 78.50 | 613.57 |
| MW2 | 11.70 | 11.57 | 4.66 | 0.40 | 1.18 | 11.20 | 22.83 | 76.29 | 574.59 |
| MW3 | 12.90 | 11.58 | 4.65 | 0.36 | 1.12 | 14.02 | 27.59 | 81.97 | 625.26 |
| Average values | | | | | | | | 78.92 | 604.48 |

In Table 5, "W" is the width of the specimen in mm, "a" is the total crack length in mm, "$P_m$" is the maximum load (in kN), "B" is the thickness in mm, "K" is the stress intensity factor (in MPa√m) calculated using $P_m$, $A_{pl}$=area under the load vs. displacement curve (in kN/m), and the energy release rate "J" (in kJ/m$^2$) is calculated as $2 \cdot A_{pl}/[B(W-a)]$.

Figure 10:
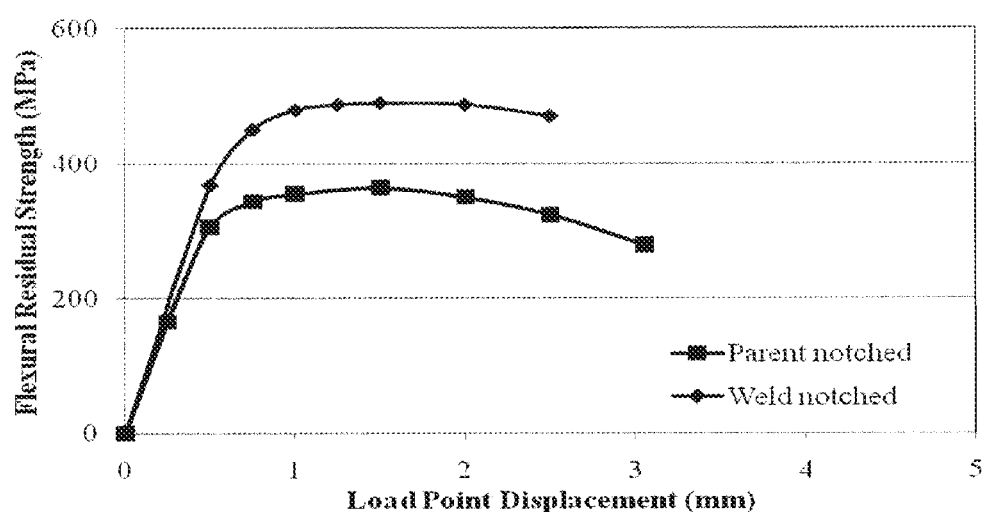

The flexural residual strength was calculated from the results and the average flexural residual strength vs. LPD curves of the notched parent and slot welded manganese rail steels are shown in FIG. 10. The average $J_1$ value obtained for the parent manganese steel is approximately 542 kJ/m$^2$, while the average $J_1$ value of the welded manganese steel is about 604 kJ/m$^2$. This is an 11% increase from the average value obtained for the parent manganese steel.

Figure 11:
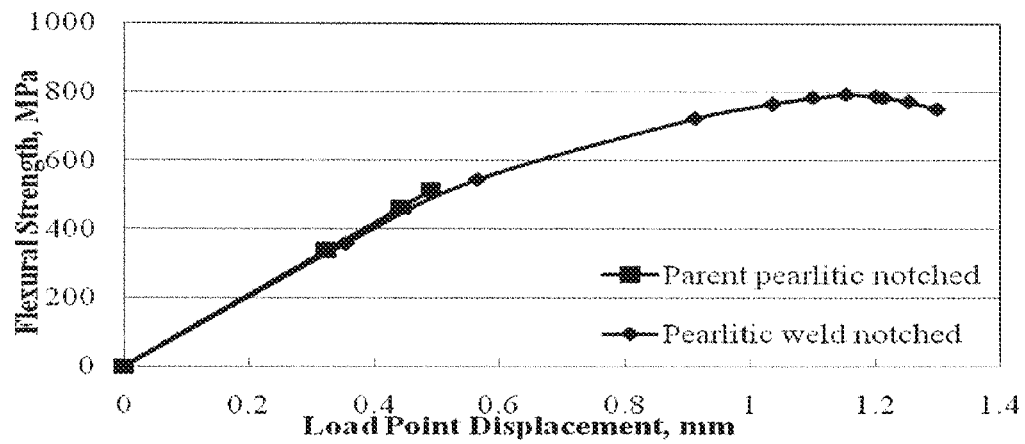

The notched parent pearlitic specimens were found to exhibit a fully linear elastic behavior to failure while the notched welded pearlitic specimen consists of a linear elastic behavior followed by a non-linear plastic behavior to failure. The maximum flexural residual strength of the pearlitic steel was 515 MPa compared to 792 MPa for the welded pearlitic steel. The LPD at the maximum stress for the notched parent pearlitic and welded rail steel were 0.5 mm and 1.15 mm, respectively. The average flexural stress vs. LPD curves for the notched pearlitic and slot welded steels based on three point bend tests are shown in the graph of FIG. 11, which comprises flexural stress versus load point displacement curves for parent and welded pearlitic rail steels. The flexural residual strength of the notched samples was calculated using the unnotched cross sectional area.

TABLE 6

| Sample | W (mm) | t (mm) | a (mm) | a/W | f(a/W) | $P_m$ (kN) | $K_1$ MPa·m$^{1/2}$ |
|---|---|---|---|---|---|---|---|
| Test results for the parent pearlitic steel | | | | | | | |
| P1 | 12.81 | 12.67 | 5.26 | 0.411 | 1.20 | 14.13 | 79.4 |
| P2 | 12.80 | 12.75 | 5.26 | 0.411 | 1.20 | 14.17 | 78.9 |
| P3 | 12.67 | 12.75 | 5.27 | 0.416 | 1.21 | 13.64 | 77.2 |
| Average value of parent $K_I$ | | | | | | | 78.5 |
| Test results for the welded pearlitic steel | | | | | | | |
| PW1 | 12.75 | 12.77 | 5.15 | 0.404 | 1.19 | 22.28 | 121.2 |
| PW2 | 12.76 | 12.75 | 5.20 | 0.408 | 1.19 | 21.33 | 117.6 |
| PW3 | 12.75 | 12.75 | 5.20 | 0.408 | 1.19 | 21.56 | 119.0 |
| Average value of welded $K_I$ | | | | | | | 119.3 |

The geometry and test results for the parent and slot welded bainitic rail steels based on the flexural bend tests of notched specimens are summarized in Table 6 and Table 7, where equations 4 and 5 were utilized for calculating $K_{IC}$. Table 6 above reports the experimental data obtained for the flexural bend test results for parent and welded pearlitic steels, while Table 7 below reports fracture toughness values of parent and welded pearlitic steels with different notch tip conditions.

TABLE 7

| | 3pt Bend (no Pre-cracking), $K_I$ | 3pt Bend (Pre-cracked), $K_P$ | Compact Tension, $K_{IC}$ |
|---|---|---|---|
| Parent | 79 ± 1.10 | 36 ± 1.16 | 41 ± 4.54 |
| Weld | 119 ± 1.83 | 88 ± 5.66 | — |

Again, the value reported in the table for $K_{IC}$ is as previously reported by Aglan et al. (2007).

Test 3—Fatigue Crack Growth

In order to assess the durability of the slot welded rail steel repairs, fatigue crack propagation experiments were performed on three point bend specimens. The crack length at intervals of number of cycles was recorded during fatigue tests, and graphs of the average crack length, "a," versus the number of cycles, "N," for both the parent and welded rail steel were produced.

The average crack speed at each crack length was obtained by calculating the slope of the curves. The relationship between the crack speed, da/dN, and crack length, a, was also determined and graphed. Fatigue crack growth kinetics depicted by these graphs were characterized by a sigmoidal feature, which can be divided into three stages. The first stage displays crack initiation, crack growth was observed in the second stage. In the third stage, unstable crack propagation kinetics was observed.

Hysteresis loops were recorded at intervals of number of cycles. The area above the unloading curve at each crack length was calculated and used as the potential energy, P. The relationship between the potential energy and the crack length was established. The slopes of these curves were calculated at each crack length and was used to determine the energy release rate, J*, based on the equation:

$$J^* = \frac{1}{B}\frac{dP}{da} \quad \text{Equation 7}$$

Where B is the specimen thickness, P is the potential energy and a is the crack length.

The Paris equation is used to rank the parent and welded rail steel. In the Paris equation, the crack growth rate is related to the stress intensity factor and can be expressed as:

$$\frac{da}{dN} = A(\Delta K)^m \quad \text{Equation 8}$$

where a is the crack length, N is the corresponding number of cycles, ΔK is the stress intensity factor and A and m are Paris law constants that are dependent upon the material's properties. In order to calculate the Paris law constants, J* is substituted for ΔK; then the log of both sides is taken. This results in the following equation:

$$\log\left(\frac{da}{dN}\right) = \log A + n\log(J^*) \quad \text{Equation 9}$$

The influence of m in the above equation is much greater than the influence of A due to its role as an exponent rather than a multiplicative factor. Applicants noted that the values of A and m obtained from these experiments for the Paris equation do not have the same trend. This casts doubt on the general applicability of the Paris equation to fully characterize FCP behavior of materials.

Specifically, in the current fatigue studies, the dimension of the various specimens used had a depth of 13 mm, width of 6.5 mm and notch depth of 3 mm. The maximum fatigue bending stress applied was 200 MPa and the minimum was 20 MPa. The fatigue frequency was 1 Hz. These parameters were selected on the rationale of mimicking a design safety factor of 2.5 (i.e., approximately 40 percent of the yield strength of the steel).

Figure 12:
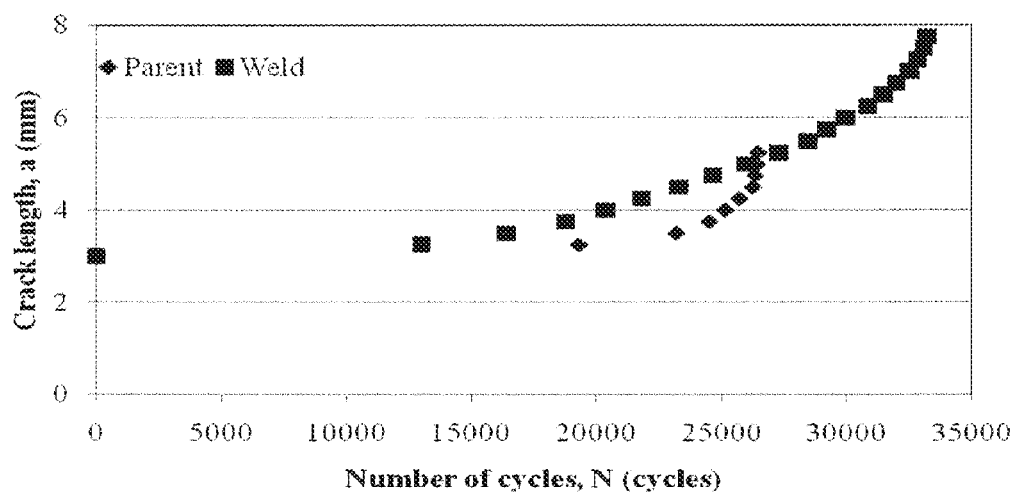
FIG. 12 through FIG. 17 are various plots reporting the experimental results for fatigue crack growth tests on parent and welded steel samples according to certain experiments detailed herein.

A graph of the average crack length, a, versus the number of cycles, N, for both the parent and welded pearlitic rail steel is shown in FIG. 12. As depicted in FIG. 12, the total fatigue lifetime of the welded pearlitic rail steel was higher than that of the parent pearlitic steel. The total average fatigue lifetime of the parent and welded pearlitic rail steel was 26500 cycles and 33000 cycles, respectively. The critical crack length for the parent pearlitic rail steel was 5.25 mm, while that for the welded steel was 7.75 mm.

Figure 13:
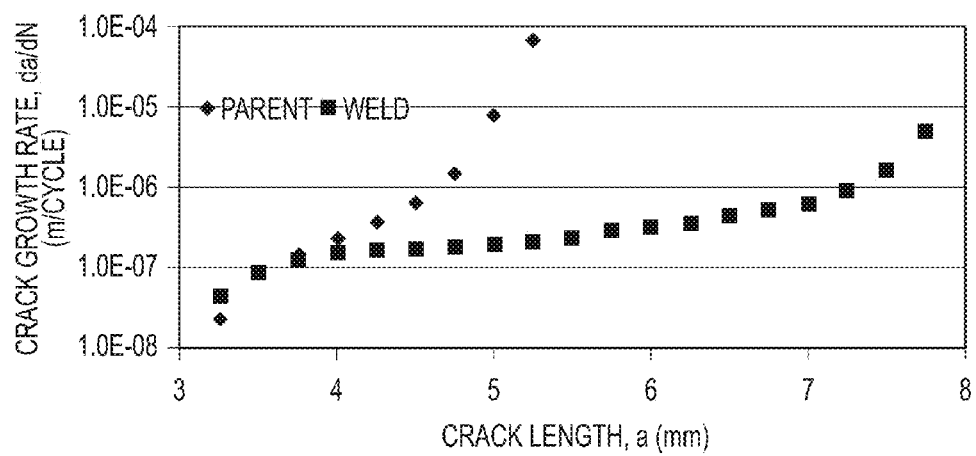

The relationship between the crack speed, da/dN, and crack length, a, for the pearlitic steel samples is shown in FIG. 13. Fatigue crack growth kinetics shown in this figure exhibit a sigmoidal behavior, which can be divided into three stages. In the beginning of the first stage, the crack growth rate of the parent pearlitic rail steel was lower than the slot welded rail steel. However, with increasing crack length up to 3.75 mm, the crack growth rate was very similar. In the second and third stages, it was clear that the crack growth rate of the welded pearlitic steel was lower at any crack length, which is indicative of superior crack growth resistance.

Figure 14:
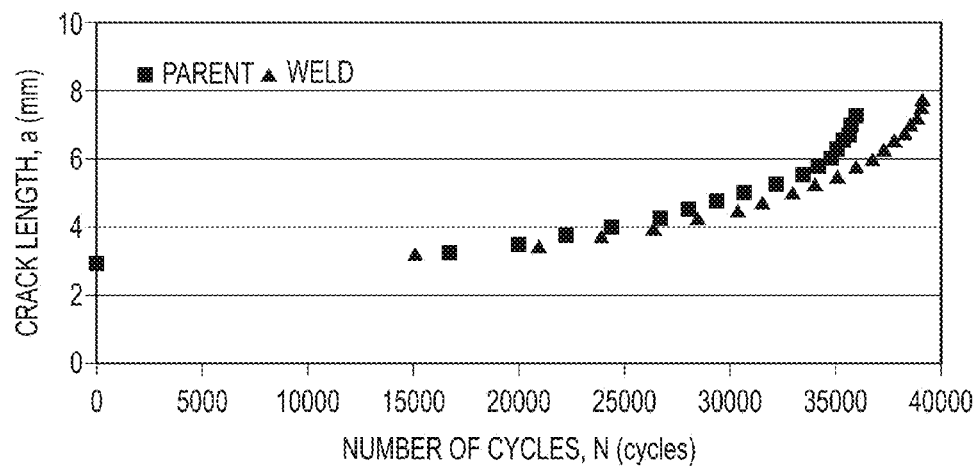

As shown by the graph of experimental results contained in FIG. 14, the methods of the invention produce welded bainitic steel repairs with total fatigue lifetimes higher than the parent steel. The total average fatigue lifetime of the parent bainitic steel was about 36000 cycles, while the slot welded bainitic steel was about 39000 cycles. The critical crack lengths of the parent and welded bainitic steels were 7.25 mm and 7.75 mm, respectively.

Figure 15:
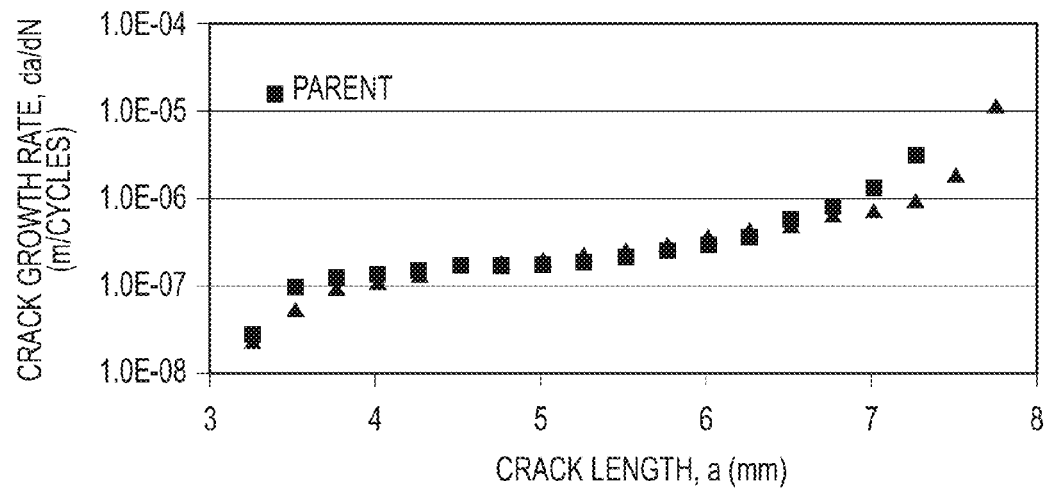

The relationship between the average crack growth rate, da/dN, and the crack length, a, of both the parent and slot welded bainitic rail steels is shown in FIG. 15. Both curves display a sigmoidal crack growth behavior, which can be divided into three stages. The first stage is the crack initiation, which extends from the beginning of the crack length to about 3.75 mm. In the second stage, stable crack propagation was observed. Unstable crack propagation was observed in the third stage. Over the three stages, the crack growth rate was similar for both steels at the same crack length.

Figure 16:
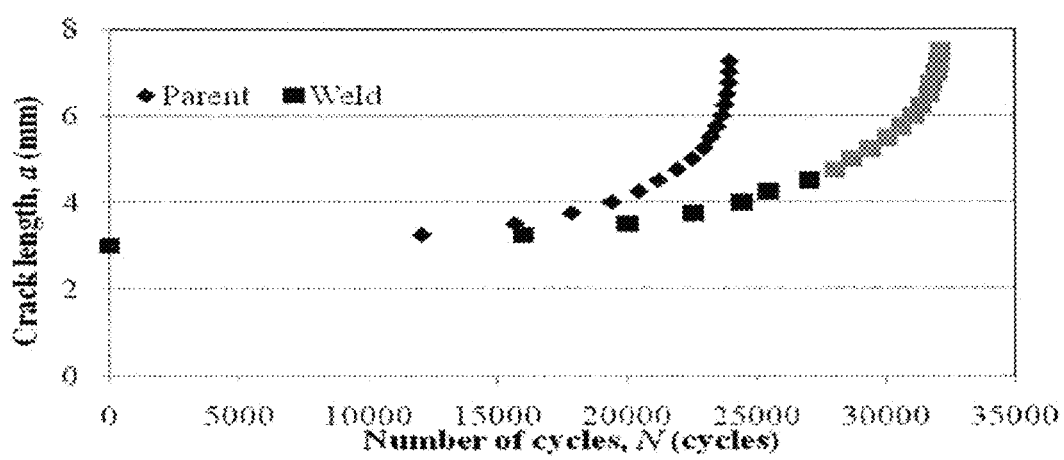

The average crack length, a, versus the number of cycles, N, for the parent and welded manganese steel is shown in FIG. 16. The fatigue lifetime of the welded manganese steel is higher than the parent manganese steel. The total average fatigue lifetime of the parent manganese steel is about 24000 cycles, compared to 32000 cycles for the welded manganese steel. The critical crack length of the parent steel is 7.25 mm, while that for the welded steel is 7.5 mm.

Figure 17:
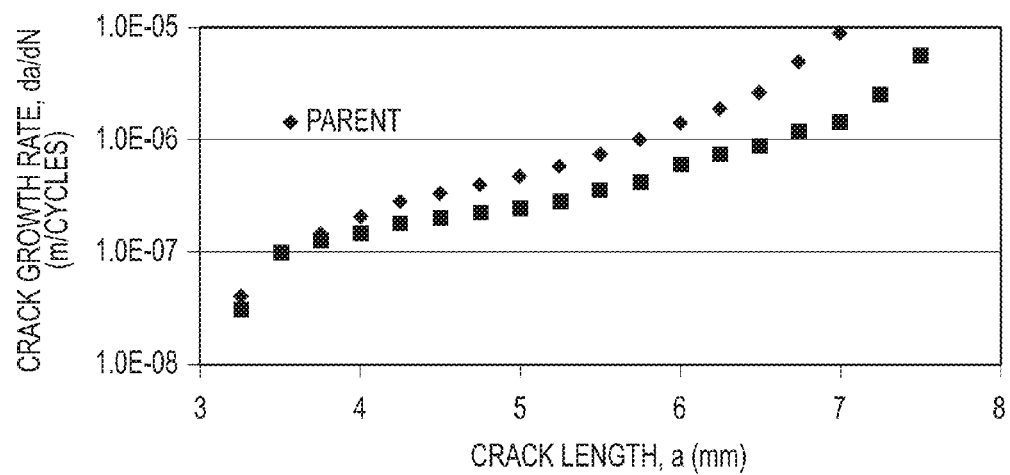

The relationship between the crack speed, da/dN, and the crack length, a, is shown in FIG. 17. In the crack initiation stage, the crack growth rate of the parent and welded manganese steels are similar. However, moving to the second and third stages of crack propagation, the crack growth rate of the parent manganese steel is higher than that for the welded steel.

Test 4—Fatigue Fracture Energy Relationships

Figure 18:
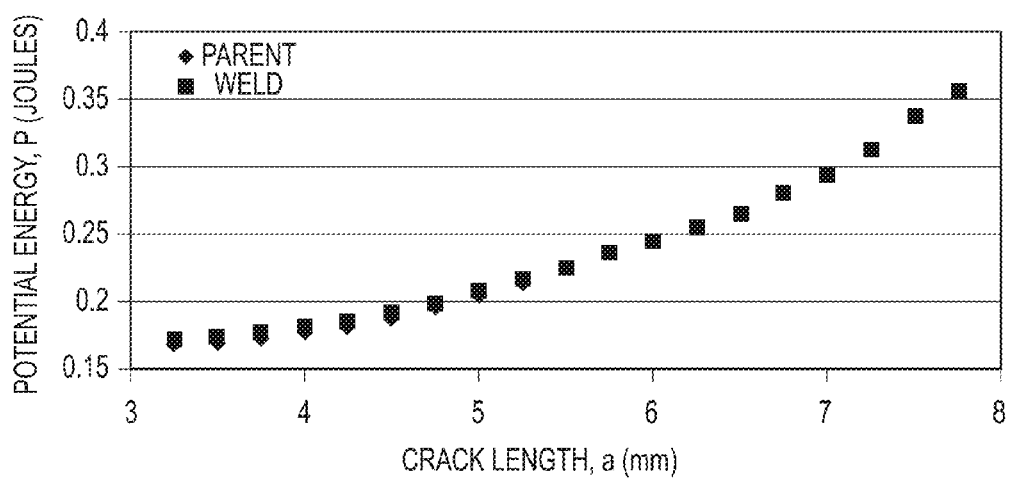
FIG. 18 through FIG. 25 are various plots reporting experimental results for potential energy and energy kinetics for crack growth in various parent and welded test samples according to experiments detailed herein.

From the same fatigue crack tests described above in Test 3, Applicants were also able to investigate the potential energy and energy release rates of the various samples. At different crack lengths, Applicants found that the potential energy of the welded pearlitic steel was slightly higher than the parent rail steel is shown in FIG. 18. Applicants also learned that the potential energy at the critical crack length of the parent pearlitic steel was lower than the slot welded pearlitic steel, namely 0.21 J for the parent pearlitic rail steel and 0.35 J for the welded pearlitic rail steel. A relatively higher energy at the critical crack length, as identified here for the welded pearlitic rail steel samples versus corresponding parent samples, indicates that it takes more energy to cause complete material separation of this welded material when compared to the parent pearlitic rail steel.

Figure 19:
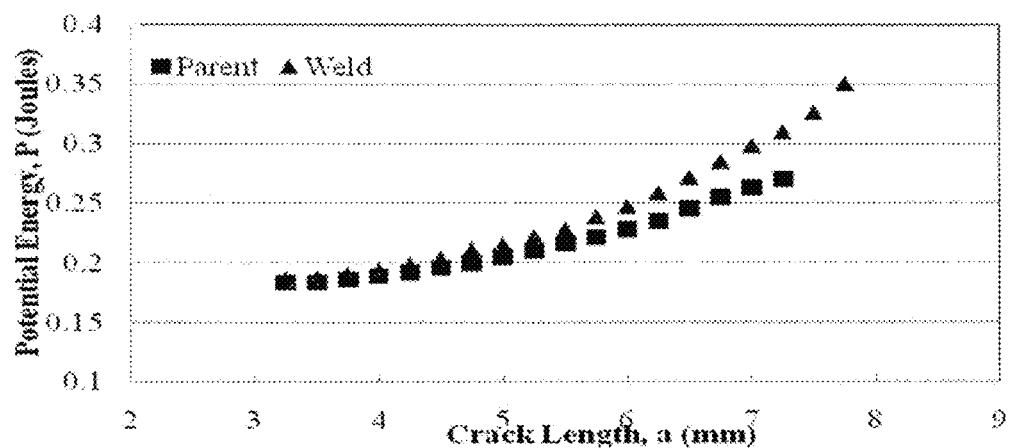

The potential energies of the parent and slot welded bainitic rail steels were very similar at lower crack lengths. However, as the crack length increased, Applicants found that the difference in the potential energy of the parent and slot welded bainitic steels becomes obvious, with the welded steel having the higher potential energy at corresponding crack length as shown in FIG. 19. The potential energy at the critical crack length of the slot welded bainitic steel was higher than that of the parent steel with values of 0.35 J and 0.27 J, respectively.

Figure 20:
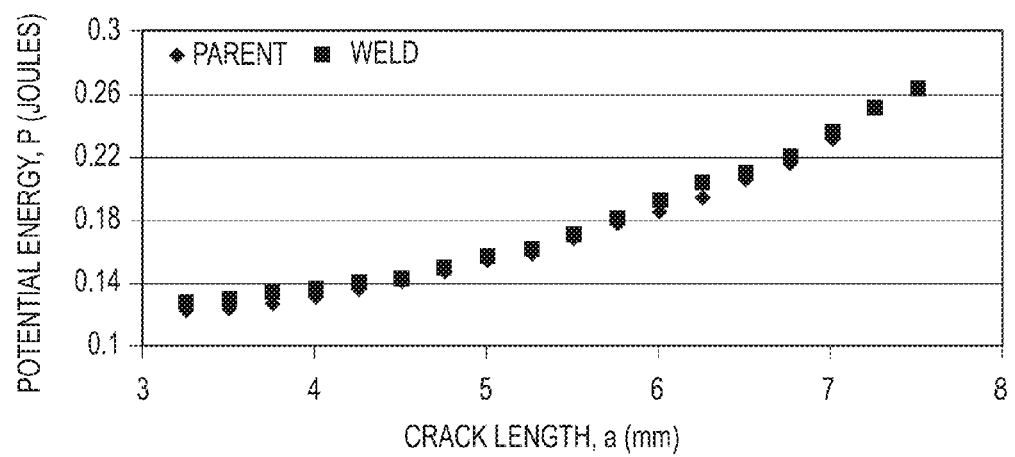

FIG. 20 depicts Applicants' experiment results obtained for the samples of parent and welded Hadenfield manganese steel samples, showing the potential energy, P, versus crack length, a. It can be seen that at the critical crack length of the parent steel the potential energy is slightly lower than that of the welded steel, namely, about 0.23 J for the parent manganese steel and 0.26 J for the welded manganese steel. The potential energies of the parent and slot welded manganese steels are similar at all crack lengths.

Test 5—Fatigue Crack Propagation ("FCP") Kinetics

The crack deceleration of both the parent and welded pearlitic rail steels started at a value of J* above 2 kJ/m². This crack deceleration is indicative of the accumulation of damage within the active zone. The resistance to FCP of a material is determined by the second stage of the FCP.

Figure 21:
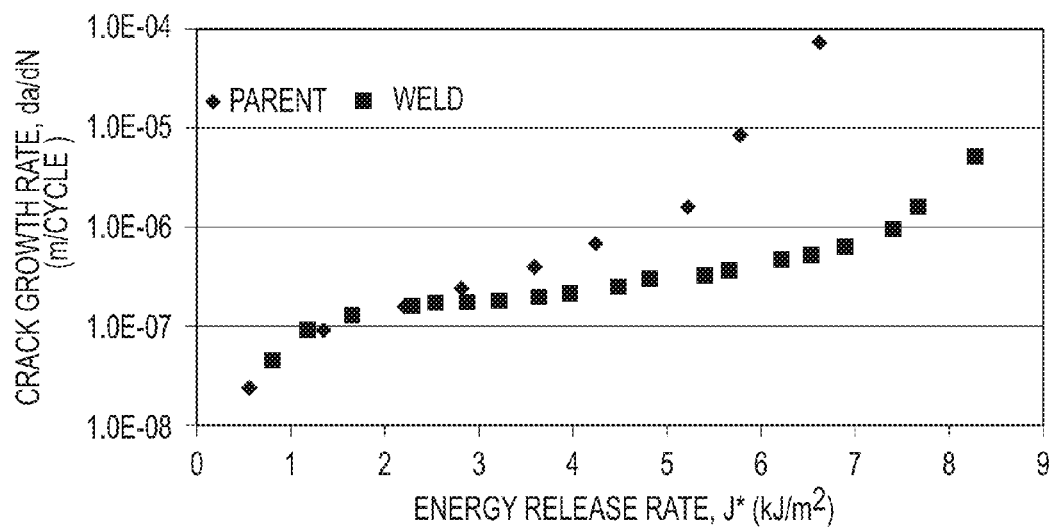
Figure 22:
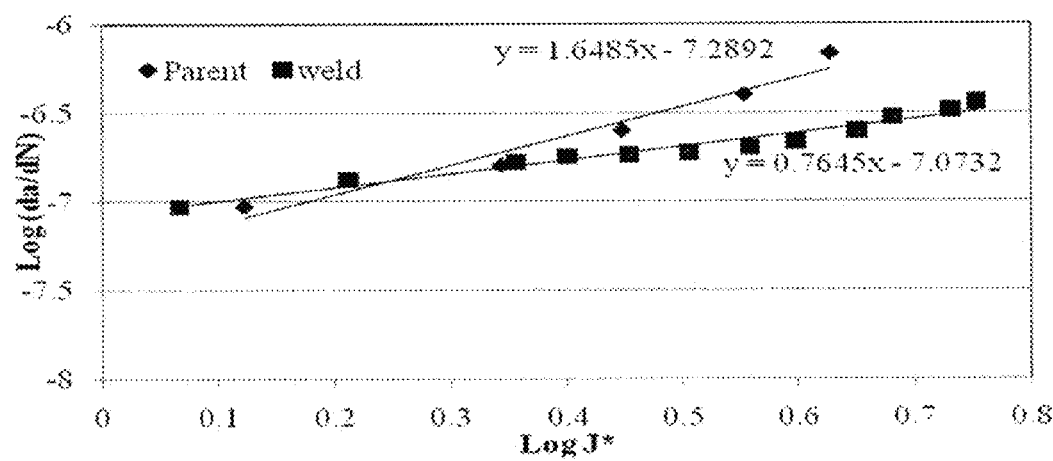

In the second stage of FCP kinetics, the welded pearlitic rail steel displays a higher crack deceleration as indicated by the lower slope as shown in the graph of FIG. 21. The welded steel also dissipates more energy than the parent steel during this stage. The third stage of the FCP kinetics shows that the fatigue crack growth rate of the parent pearlitic rail steel was higher than the welded rail steel. A logarithmic plot of the Paris Law (with the constants being shown in Table 8 below) is depicted in the graph of FIG. 22, from which average values for A and m were determined.

TABLE 8

| Material | A | m |
| --- | --- | --- |
| Parent pearlitic rail steel | $5.14 \times 10^{-8}$ | 1.65 |
| Welded pearlitic rail steel | $8.45 \times 10^{-8}$ | 0.76 |

Figure 23:
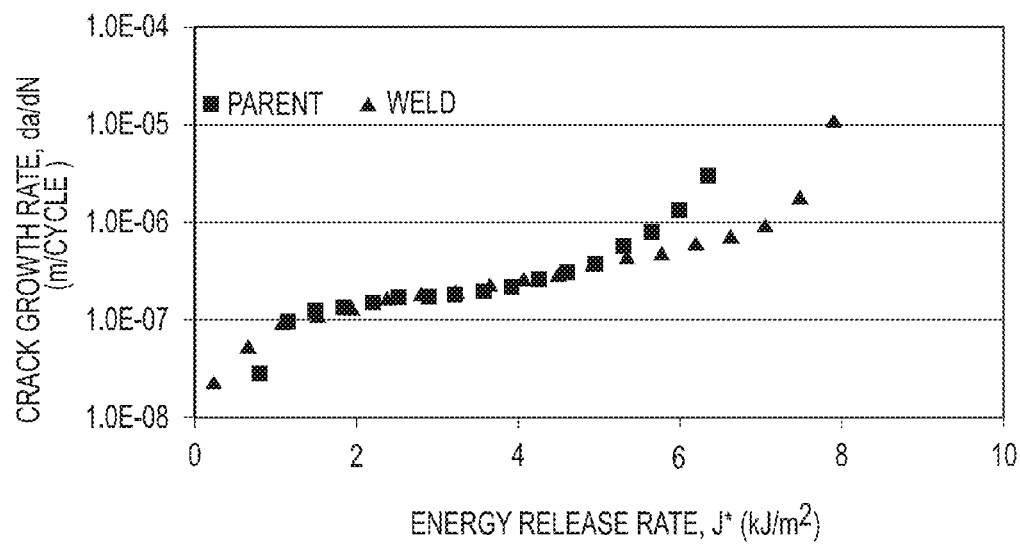

The relationship between the fatigue crack propagation and the energy release rate of the parent and slot welded bainitic rail steels is shown in FIG. 23. This curve is similar to the one obtained for the relationship of crack growth rate and crack length for the same steels as shown in FIG. 15. The deceleration of the crack for both the parent and welded bainitic steels started after an energy release rate above 2 kJ/m². In the second stage, the FCP kinetics was similar for the parent and slot welded bainitic rail steels. However, over the entire stable crack propagation stage, the welded bainitic steel dissipates more energy than the parent steel, which takes more energy from the fracture process and therefore reduces the crack growth rate.

Figure 24:
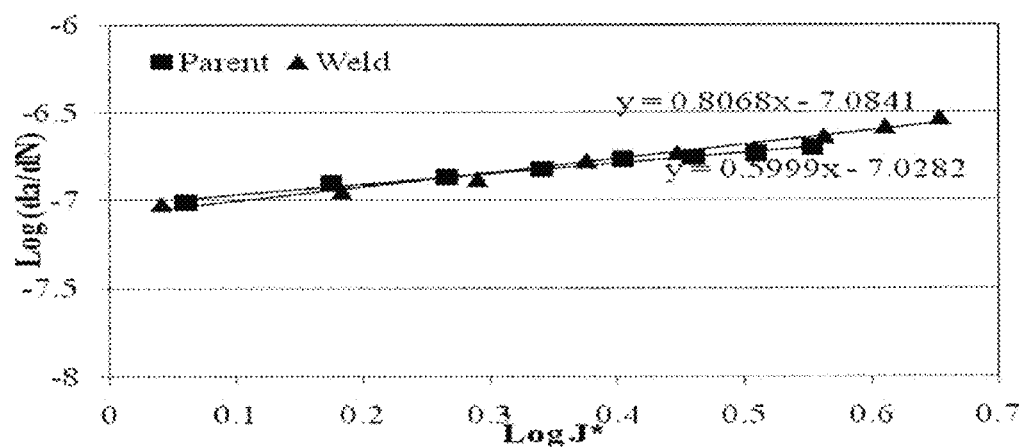

FIG. 24 is the log-log plot of stage II of FIG. 23. The average Paris law constants for the parent and welded bainitic steels are given in Table 9 below. The parent bainitic rail steel has a lower value for the constant m when compared to the welded bainitic steel with values of 0.60 and 0.81, respectively. However, the value of A for the slot welded bainitic steel was lower than that for the parent steel. These values follow the same trend as noted for the parent and slot welded pearlitic steels.

TABLE 9

| Material | A | m |
| --- | --- | --- |
| Bainitic rail steel | $9.37 \times 10^{-8}$ | 0.60 |
| Welded Bainitic rail steel | $8.24 \times 10^{-8}$ | 0.81 |

Figure 25:
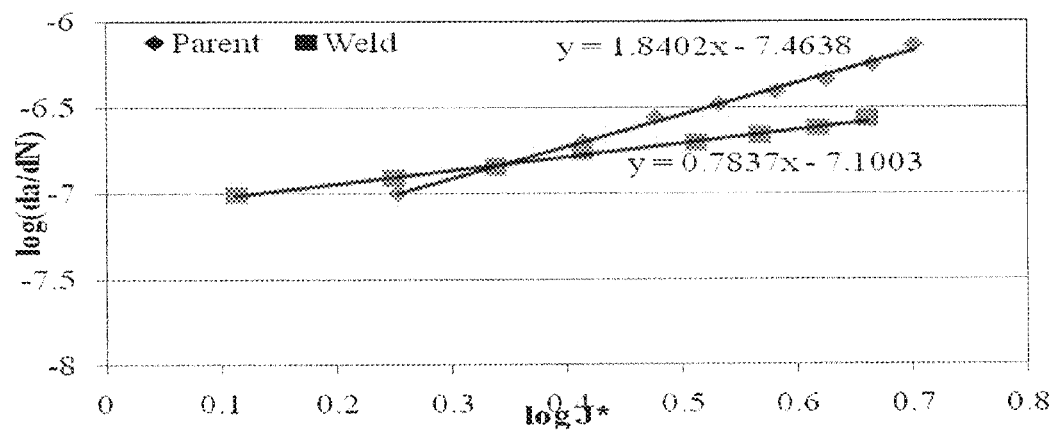

The log of the energy release rate, J*, and the crack speed, da/dN, were calculated for stage II of the parent and welded manganese steel. The results are shown in FIG. 25 and were used to calculate the Paris law constants for both steels. The average values for the Paris law constants were obtained from FIG. 25, and are shown in Table 10 below. The constant A for the parent steel is lower than that of the welded manganese steel. However, the constant m of the parent manganese steel is more than twice that of welded manganese steel, with values of 1.84 and 0.78, respectively. These values follow the same trend as the parent and slot welded pearlitic and bainitic steels and would therefore not be able to fully characterize the fatigue behavior of the parent and welded bainitic steels over the three stage of the FCP kinetics.

TABLE 10

| Material | A | m |
| --- | --- | --- |
| Parent manganese steel | $3.44 \times 10^{-8}$ | 1.84 |
| Welded manganese steel | $7.94 \times 10^{-8}$ | 0.78 |

Test 6—Fatigue Fracture Morphology

Figure 26:
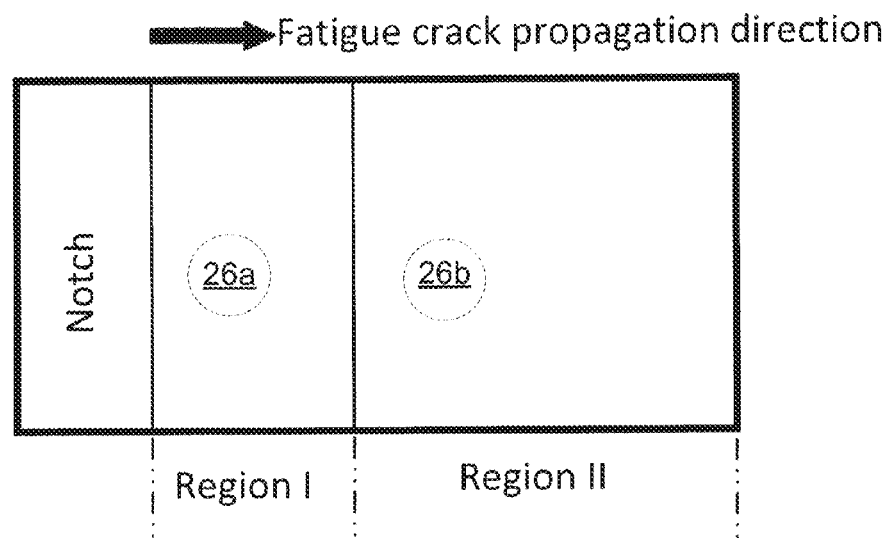
FIG. 26 is a schematic diagram representing where on a fractured steel sample surface certain SEM observations were taken in certain experiments detailed herein.

Fracture surface morphology examinations were performed on fatigue-failed specimens of the parent and welded rail steels to identify the fatigue damage species. The fracture surface of fatigue-failed samples can be divided into two regions according to their morphological features. A schematic representation of the fractured surface is shown in FIG. 26 with locations 26a and 26b designating approximately where SEM observations were done. All images for this test were captured at 500× magnification.

Figure 27A:
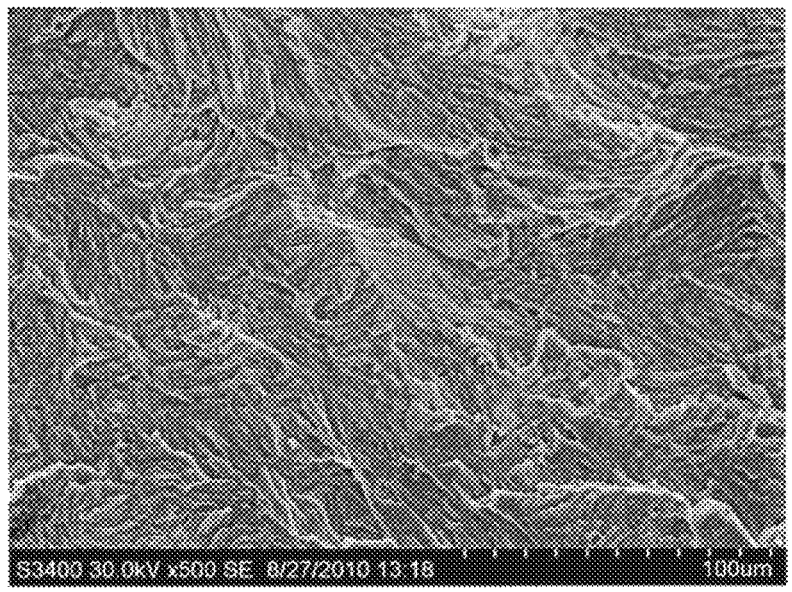
FIG. 27A and FIG. 27B are black and white photographs of SEM micrographs taken of a representative parent pearlitic steel sample at 500× taken from the beginning of the stable crack propagation region, and the middle of the fast crack propagation region, respectively.
Figure 27B:
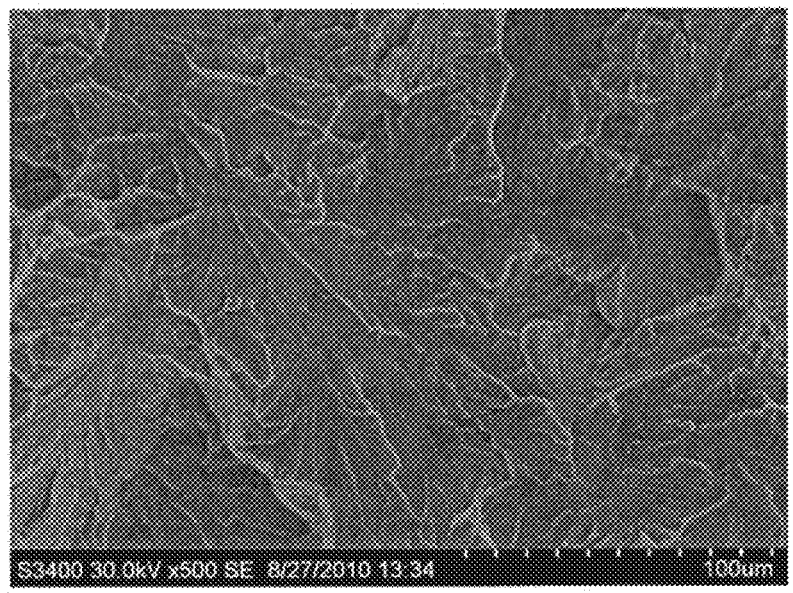
Figure 28A:
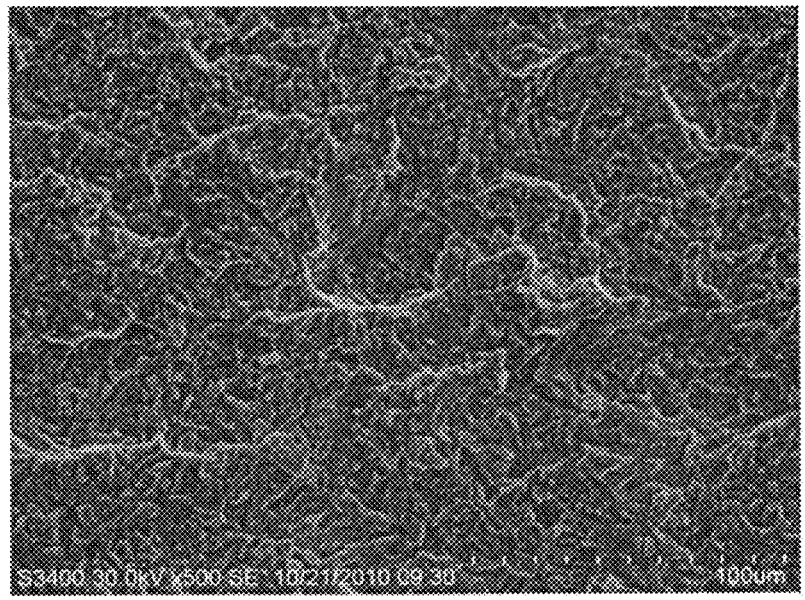
FIG. 28A and FIG. 28B are black and white photographs of SEM micrographs taken of a representative welded pearlitic steel sample at 500× taken from the beginning of the stable crack propagation region, and the middle of the fast crack propagation region, respectively.
Figure 28B:
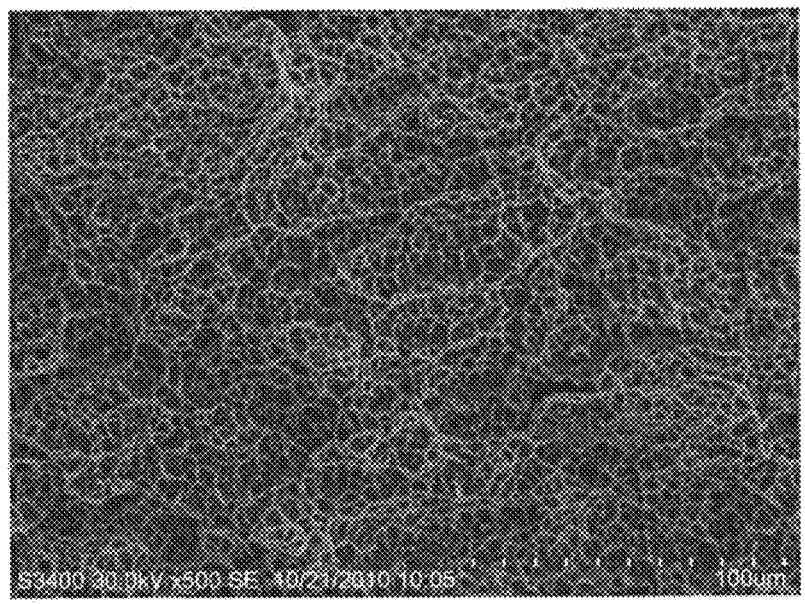

The fracture surface of a representative fatigue-cracked specimen of parent pearlitic steel at Regions I and II is shown in the black and white micrograph photographs of FIG. 27A and FIG. 27B, respectively. At Region I, pulled-up pearlite lamellae, ductile tearing and limited microcracks can be seen in FIG. 27A. These features are indicative of a ductile fracture mechanism associated with the first stage of stable crack growth. Observation of Region II of the fracture surface, the fast crack region, clearly shows cleavage fracture. There are also river patterns as evident in the center of the fracture surface and multiple micro-cracks. These features reveal that a semi-brittle mechanism is the main fracture mechanism associated with region II of the pearlitic fatigue specimen. The features observed on the fracture surface indicate that moving from the stable crack propagation region to the unstable crack propagation region, the fracture mechanism changes from ductile to semi-brittle. For purposes of comparison, the black and white micrograph photographs of a representative welded pearlitic steel specimen is shown FIG. 28A (Region I) and FIG. 28B (Region II). Region I in FIG. 28A shows ductile tearing ridgelines and pulled up material as the main failure mechanisms. These features are indicative of a ductile failure. The micrograph taken from the middle of the fast crack propagation region (Region II) in FIG. 28B displays void coalescence and tearing ridgelines. This failure mechanism is associated with a ductile failure and was initiated by the formation of voids at inclusions during plastic deformation. The fracture surface morphological features displayed in these micrographs demonstrate that the welded pearlitic rail steel produce via the techniques described herein offers more resistance to material separation than the parent pearlitic steel.

For bainitic parent steel, a black and white photograph of a representative specimen's micrograph taken at the beginning of the stable crack propagation region (Region I) is shown in FIG. 28A. Extensive fatigue damage is observed on the fracture surface. These are revealed by ductile inter-granular tearing and ridge formation. These features are indicative of a crack deceleration process and signify a very high energy consuming process. The fracture surface at the fast crack propagation region (Region II) for the same representative parent bainitic sample is shown in the black and white photograph of FIG. 28B. The fracture surface contains void coalescence at multiple locations, which is indicative of high resistance to material separation. Tearing ridges and limited micro-cracks are also noticeable on the surface. The fracture surface morphology over the entire fractured surface reveals a ductile failure mechanism.

Figure 29A:
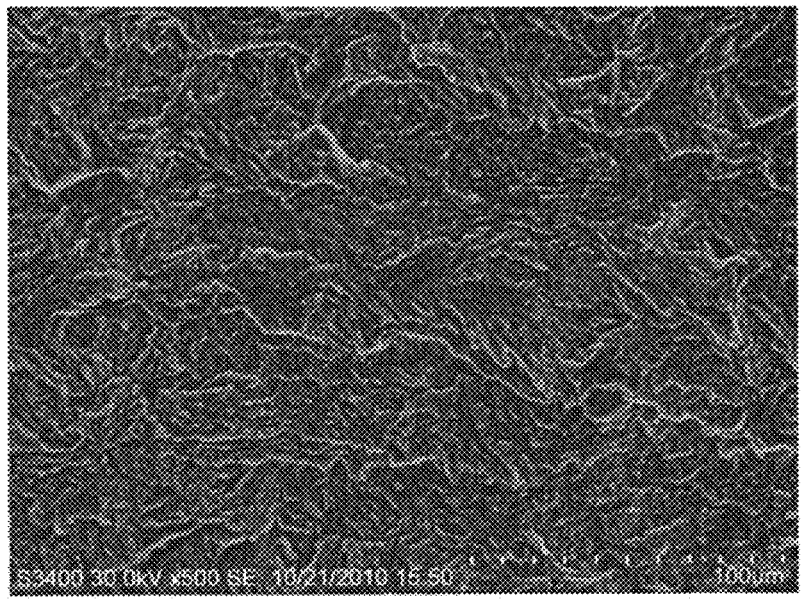
FIG. 29A and FIG. 29B are black and white photographs of SEM micrographs taken of a representative parent bainitic steel sample at 500× taken from the beginning of the stable crack propagation region, and the middle of the fast crack propagation region, respectively.
Figure 29B:
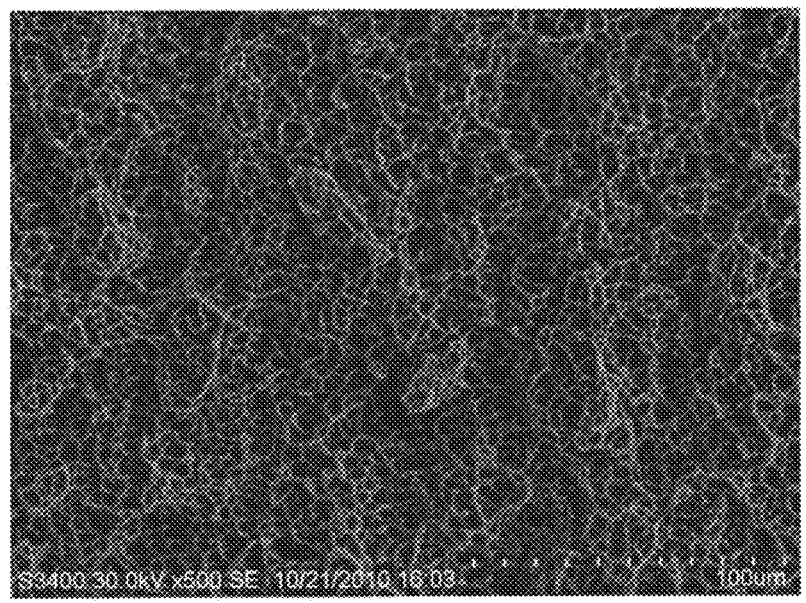

For the welded bainitic steels, a black and white photograph of a micrograph for a representative specimen at the beginning of the stable crack propagation region is shown in FIG. 29A. This micrograph reveals pulled up materials and tearing ridgelines, which are aligned along the crack growth direction. The corresponding micrograph taken at the middle of the fast crack propagation region (Region II) for this same specimen is shown in FIG. 29B, where microvoid coalescence is observed. This is associated with ductile failure, thus the entire fracture surface for welded bainitic steel specimens displays a ductile failure mechanism. The fracture surface morphological features reveal that the slot welded bainitic steel offers more resistance to material separation than the parent bainitic steel.

Figure 30A:
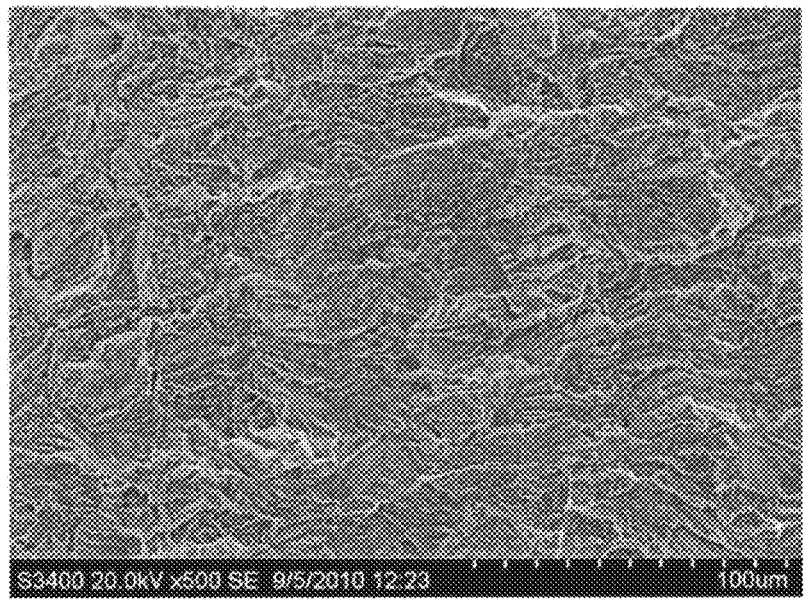
FIG. 30A and FIG. 30B are black and white photographs of SEM micrographs taken of a representative welded bainitic steel sample at 500× taken from the beginning of the stable crack propagation region, and the middle of the fast crack propagation region, respectively.
Figure 30B:
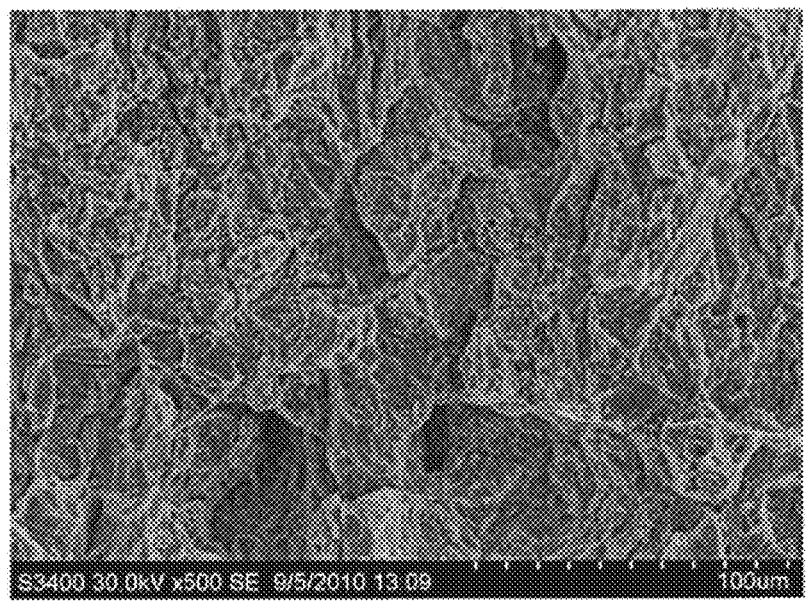

The fracture surface morphology for a representative parent manganese steel specimen is shown in FIG. 30A, taken from the beginning of the stable crack propagation region. As can be seen in the black and white photograph of a micrograph of FIG. 30A, extensive fatigue damage features are detectable. The fracture surface consists of a damaged matrix with pulled-up ridgelines aligned with the propagation direction. These features imply that severe fatigue damage and high energy consumption is associated with the stable crack propagation region. The middle of the fast crack propagation region for this same specimen, the micrograph of which is depicted in FIG. 30B, consists of extensive void formation and material removal. A rougher surface is associated with this region in comparison with the stable crack region.

Figure 31A:
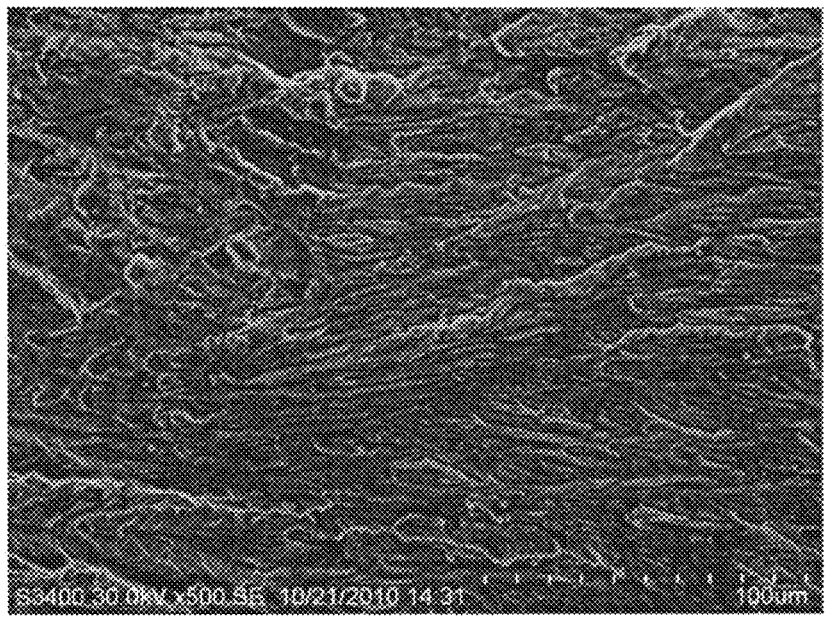
FIG. 31A and FIG. 31B are black and white photographs of SEM micrographs taken of a representative parent manganese steel sample at 500× taken from the beginning of the stable crack propagation region, and the middle of the fast crack propagation region, respectively.
Figure 31B:
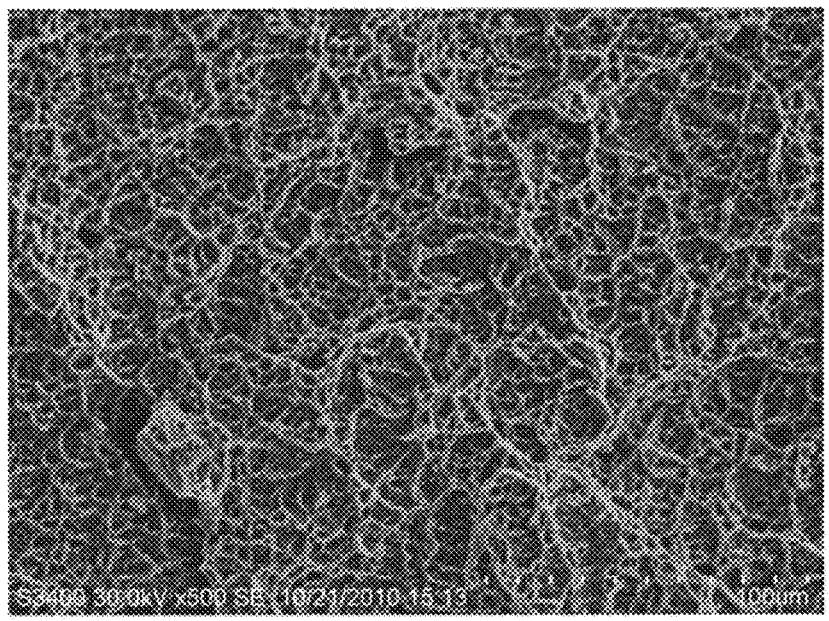
Figure 32A:
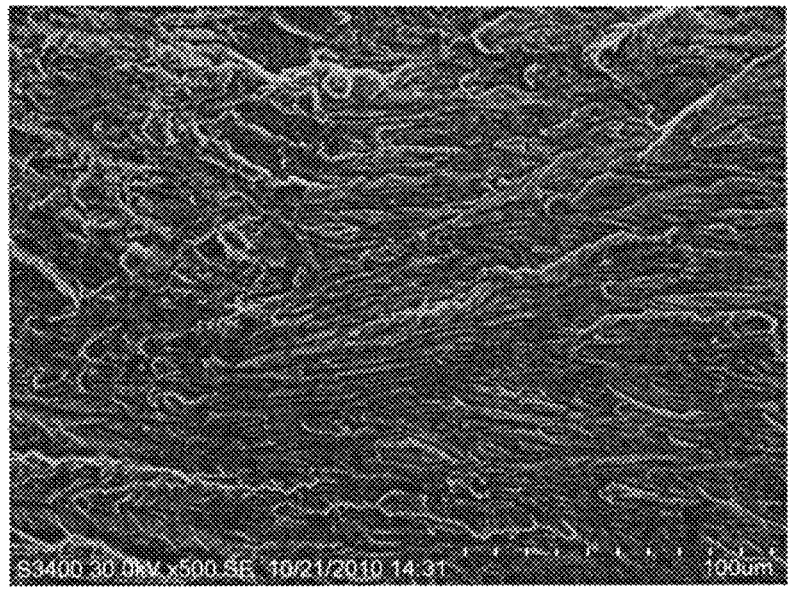
FIG. 32A and FIG. 32B are black and white photographs of SEM micrographs taken of a representative parent manganese steel sample at 500× taken from the beginning of the stable crack propagation region, and the middle of the fast crack propagation region, respectively.
Figure 32B:
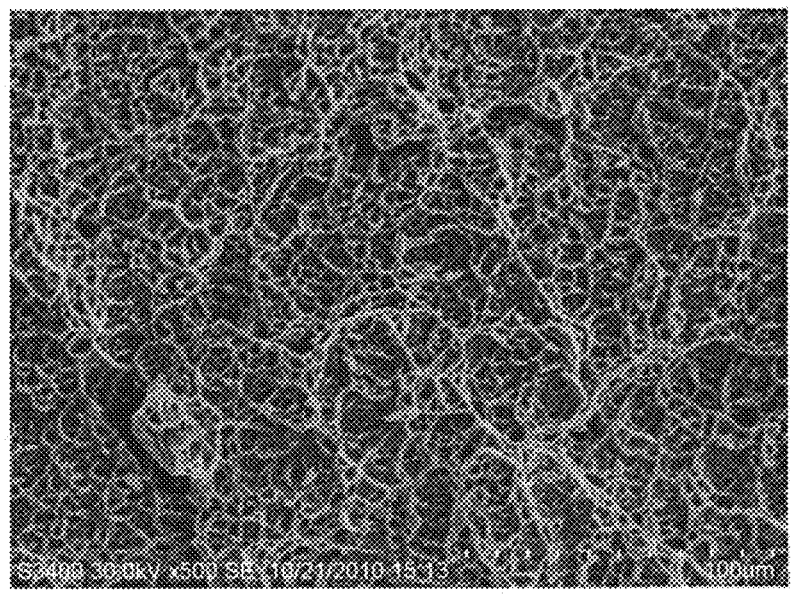

The fracture surface morphology micrographs for a representative specimen for welded manganese steel taken from the beginning of the stable crack propagation region and at the middle of that fast crack propagation region are shown in the black and white photographs of FIG. 31A and FIG. 31B, respectively. At the beginning of the stable crack propagation region for the welded manganese steel, severe fatigue damage morphology features can be observed in FIG. 32A, which include ductile tearing ridgelines and pull-up strips that are aligned in the propagation direction. The middle of the fast crack propagation region shown in FIG. 32B consists of mainly void coalescence. The features associated with the beginning of the stable crack propagation region, as well as the middle of the fast crack propagation region of the welded manganese steel, is indicative of a ductile failure mechanism in all the stages.

Test 7—Hardness

Samples for all parent and welded steel types were also tested for their hardness. A total of five tests were done on each sample and the average of the tests was recorded. For the hardness testing the Clark CLC-200R Rockwell type tester was used. A diamond indenter was used with force of 150 kgf. The Brinell hardness values were obtained automatically from the instrument based on the depth of indentation.

The results obtained from this hardness test is reported Table 11 below. The bainitic rail steel was found to have the highest value of 425 while the minimum value for the corresponding weld is 300. The hardness of manganese steel weld is 230 compared to 225 of the parent manganese steel.

TABLE 11

| | Hardness (HB) | | |
|---|---|---|---|
| Material | Pearlite Steel | Bainaite Steel | Manganese steel |
| Parent | 375 | 425 | 225 |
| Weld | 220 | 300 | 230 |

Figure 33:
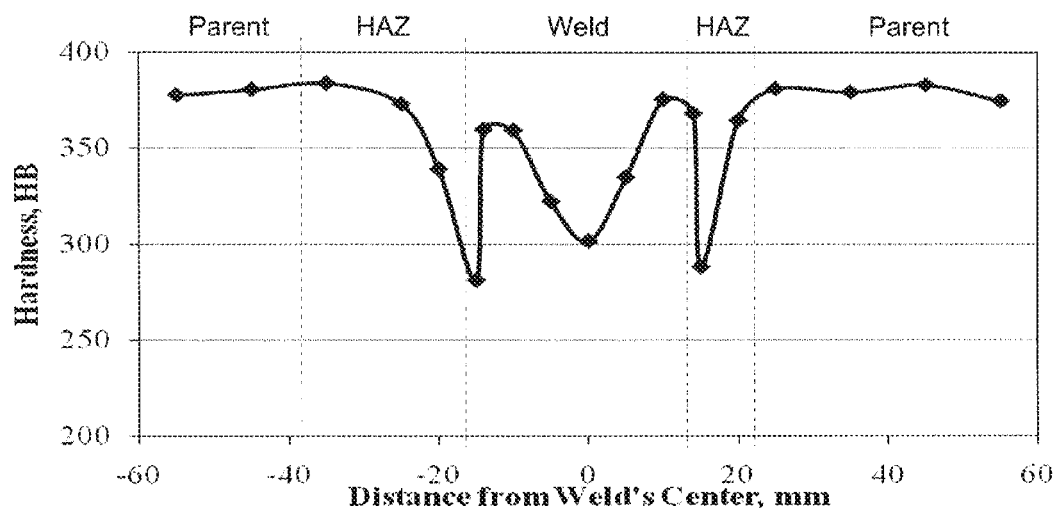
FIG. 33 through FIG. 35 are various plots reporting experimental results for hardness distribution tests on various parent and welded test samples according to experiments detailed herein.

The hardness distribution of the pearlitic rail steel that was slot welded using ESAB140 wire is shown in the plot of FIG. 33. The lowest hardness was observed in the HAZ and has a value of 281 HB. This was a 26% decrease from the parent pearlitic steel. In the welded region, the center of the weld showed the lowest hardness, which was 302 HB. This is a 19% decrease from the parent pearlitic steel. Moving towards the fusion zone, from the center of the weld, the hardness begins to increase until the fusion zone is reached. There was a slight 3% decrease in the hardness close to the fusion zone when compared to the parent pearlitic rail steel.

The approximate size of the HAZ, based on the hardness distribution, was 10 mm. The hardness distribution of the ESAB140 slot weld reveals that the hardness values over the entire distribution were greater than 250 HB, unlike the LA-100 and ESAB120 slot welds. The hardness distribution also shows that the lowest hardness in the ESAB140 weld was about 300 HB compared to 220 HB and 233 HB for the LA-100 and ESAB120 slot welded pearlitic steels, respectively. The size of the HAZ was about 14 mm based on the hardness distribution.

Figure 34:
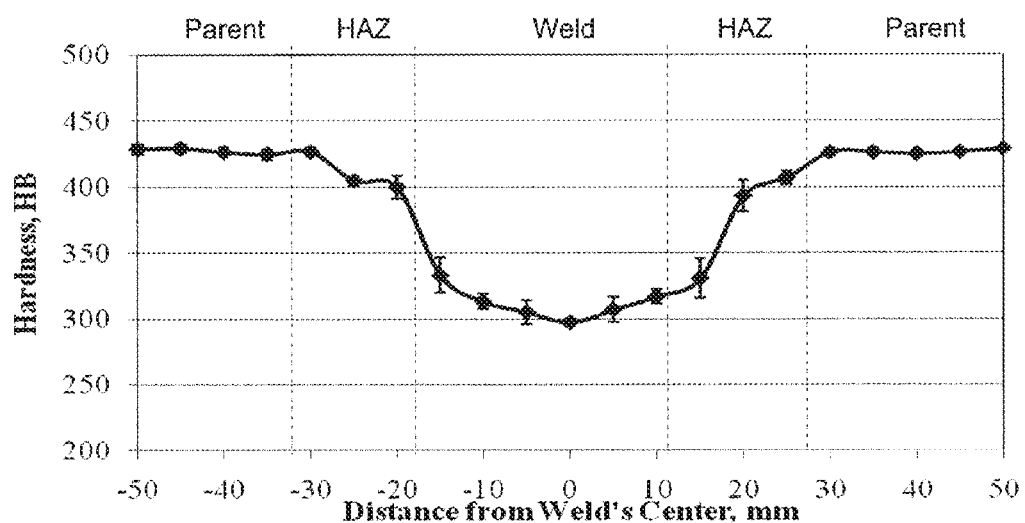

The hardness of the slot welded bainitic rail steel was recorded at different locations on the sample to generate the hardness distribution. These measurements were taken every 5 mm from the center of the weld to 50 mm in both directions. The hardness distribution obtained is shown in FIG. 34. The average hardness of the unaffected parent bainitic rail steel was about 425 HB. It is evident that the center of the welded region has the lowest hardness with a value of about 300 HB. Moving from the center of the weld to the fusion zone there was a slight increase in the hardness.

The HAZ has a slight decrease in hardness when compared to the parent material. Moving from the fusion zone towards the unaffected parent material, it is shown that the hardness was increasing until it reached the unaffected parent material. The minimum and maximum hardness in the HAZ were 393 and 407 HB, respectively. From the hardness distribution, the size of the HAZ is approximately 17 mm.

Figure 35:
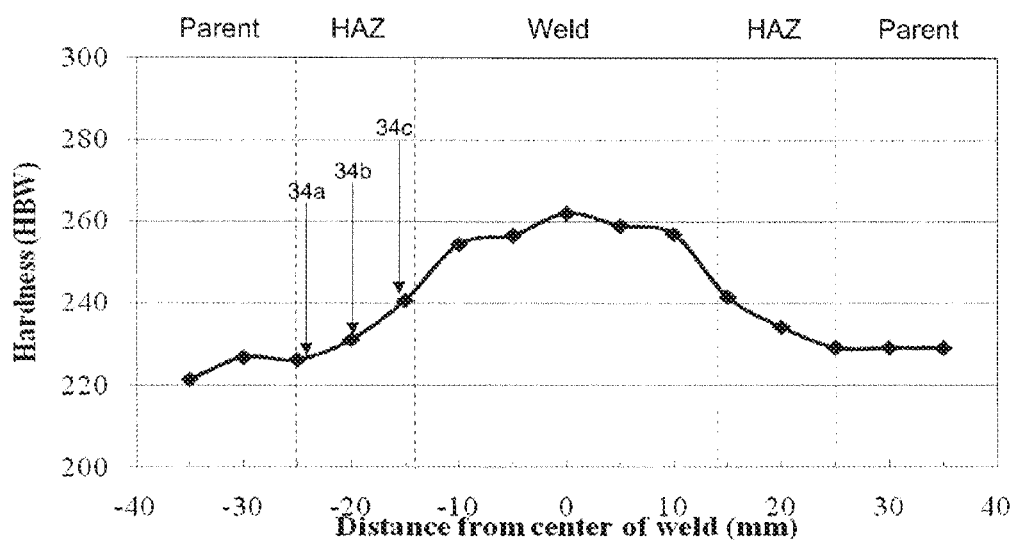

The hardness distribution of the welded manganese steel is shown in the plot of FIG. 35, where the center of the weld is represented by position 0 on the x-axis. It shows that the hardness in the weld is higher than that of the parent steel. The maximum hardness in the weld was about 260 HB compared to 225 HB in the parent. This is an increase of over 15%. The hardness of the HAZ ranges from 230 HBW to approximately 254 HBW with the higher values closer to the fusion zone. Based on the hardness distribution the size of the HAZ was approximately 12 mm.

The various experimental test results summarized above show that rail defects for rails formed from various different steels can be adequately repaired in-situ using the techniques of the invention. Having described preferred embodiments of the invention, it will now become apparent to those of ordinary skill in the art that other embodiments incorporating these concepts may be used. Accordingly, it is submitted that that the invention should not be limited to the described embodiments but rather should be limited only by the spirit and scope of the appended claims.

Thus, although the invention has been described and illustrated with a certain degree of particularity, it is understood that the present disclosure has been made only by way of example, and that numerous changes in the combination and arrangement of steps, ingredients, or processes can be resorted to by those skilled in the art without departing from the spirit and scope of the invention, as will be claimed hereafter.

The invention claimed is:

1. A method for repairing railhead defects in a steel rail, comprising:
removing the railhead defect by forming a slot in a railhead of a steel rail, said slot removing defective material and some surrounding material, said slot being formed in a general perpendicular direction to the longitudinal direction of the rail;
selecting a welding material having mechanical properties closely correlating with those of the steel rail;
wherein said welding material has a lower carbon content than that of the steel rail;
pre-heating the welding area using electrical strip heaters clamped on both sides of the steel rail to uniformly raise the temperature of the steel rail between approximately 150° C. to 450° C.;
using said welding material to fill the slot by multi-pass gas metal arc welding ("GMAW") at a heat input that is sufficiently high to avoid ductile fracture characteristics and sufficiently low to avoid brittle fracture characteristics, wherein a sufficient number of passes of said GMAW is performed until said slot is completely filled by a weld formed from said welding material;
applying post-weld heat treatment to an area of the weld for 2-20 minutes to cause austenization;
quenching of the weld; removing any excess welding material extending out of said slot so as to form a substantially continuous repaired railhead surface.

2. The method according to claim 1, wherein during said defect removing step a web and a base of the rail are unaltered.

3. The method according to claim 1, wherein said excess removing step is performed by grinding.

4. The method according to claim 1, wherein said process is performed in situ without removing said rail from its installation in a track.

5. The method according to claim 1, wherein said steel rail comprises pearlitic steel and said post-weld heat treatment comprises heating the area of the weld to a treatment temperature just above an austenization temperature of the filler material, holding the area at that treatment temperature, and then quenching the area.

6. The method according to claim 1, wherein said railhead is formed from pearlitic steel, and said step of post-weld heat treatment increases hardness of the weld by causing the weld's microstructure to adopt martensitic and austenitic phases.

7. The method according to claim 1, wherein said weld material closely mimics a steel alloy composition of the rail repaired.

8. The method according to claim 7, wherein said weld material is selected from the group consisting of LA-100, ESAB 120, and ESAB 140 for pearlitic steel rails.

9. The method according to claim 8, wherein said rail comprises pearlitic steel, and wherein said GMAW uses a heat input of approximately 1.20-1.55 KJ/mm and a feed speed of approximately 9.0-10.5 m/min.

10. The method according to claim 9, wherein said heat input is approximately 1.27 KJ/mm and a feed speed of approximately 9.9 m/min.

11. The method according to claim 1, wherein GMAW uses an arc travel speed of approximately 300 to 420 mm/min.

12. The method according to claim 11, wherein said arc travel speed is approximately 372 mm/min for pearlitic steel.

13. A method for repairing railhead defects in a steel rail, comprising:
removing the railhead defect by forming a slot in a railhead of a steel rail, said slot removing defective material and some surrounding material, said slot being formed in a general perpendicular direction to the longitudinal direction of the rail;
selecting a welding material having physical mechanical properties closely correlating with those of the steel rail;
wherein said steel rail is pearlitic steel;
pre-heating the welding area using electrical strip heaters clamped on both sides of the pearlitic rail to uniformly raise the temperature of the pearlitic rail to approximately 150° C. to 450° C.;
using said welding material to fill the slot by multi-pass gas metal arc welding ("GMAW") at a heat input that is sufficiently high to avoid ductile fracture characteristics and sufficiently low to avoid brittle fracture characteristics, wherein a sufficient number of passes of said GMAW is performed until said slot is completely filled by a weld formed from said welding material;
applying post-weld heat treatment to an area of the weld at a temperature of 855° C. for 2-20 minutes to cause austenization;
quenching of the weld;
removing any excess welding material extending out of said slot so as to form a substantially continuous repaired railhead surface.

14. A method for repairing railhead defects in a steel rail, comprising:
removing the railhead defect by forming a slot in a railhead of a steel rail, said slot removing defective material and some surrounding material, said slot being formed in a general perpendicular direction to the longitudinal direction of the rail;
selecting a welding material having mechanical properties closely correlating with those of the steel rail;
pre-heating the welding area using electrical strip heaters clamped on both sides of the rail to uniformly raise the temperature of the rail to approximately 150° C.;
using said welding material to fill the slot by multi-pass gas metal arc welding ("GMAW") at a heat input that is sufficiently high to avoid ductile fracture characteristics and sufficiently low to avoid brittle fracture characteristics, wherein a sufficient number of passes of said GMAW is performed until said slot is completely filled by a weld formed from said welding material;
applying post-weld heat treatment to an area of the weld for 2-20 minutes to cause austenization;
quenching of the weld;
removing any excess welding material extending out of said slot so as to form a substantially continuous repaired railhead surface.

* * * * *